(12) United States Patent
Daniel et al.

(10) Patent No.: US 8,550,890 B1
(45) Date of Patent: Oct. 8, 2013

(54) ELECTRONIC FANTASY SPORTS SYSTEM AND METHOD

(71) Applicants: Isaac S. Daniel, Miramar, FL (US); Chuck Kowalski, Miramar, FL (US)

(72) Inventors: Isaac S. Daniel, Miramar, FL (US); Chuck Kowalski, Miramar, FL (US)

( * ) Notice: Subject to any disclaimer, the term of this patent is extended or adjusted under 35 U.S.C. 154(b) by 0 days.

(21) Appl. No.: 13/651,164

(22) Filed: Oct. 12, 2012

Related U.S. Application Data

(63) Continuation-in-part of application No. 12/613,717, filed on Nov. 6, 2009, now Pat. No. 8,333,642.

(51) Int. Cl.
*A63F 9/24* (2006.01)
(52) U.S. Cl.
USPC ............... 463/4; 463/2; 463/3; 463/5; 700/91
(58) Field of Classification Search
USPC ...................... 463/4, 2, 3, 5; 700/91
See application file for complete search history.

(56) References Cited

U.S. PATENT DOCUMENTS

| | | | | |
|---|---|---|---|---|
| 6,371,855 | B1 * | 4/2002 | Gavriloff | 463/42 |
| 2005/0055232 | A1 * | 3/2005 | Yates | 705/1 |
| 2012/0316659 | A1 * | 12/2012 | Magas | 700/91 |
| 2013/0079073 | A1 * | 3/2013 | Sharifi | 463/3 |

OTHER PUBLICATIONS

"Rules: Creating a Custom League," by ESPN.com, 2009, available at http://games.espn.go.com/ffl/content?page=fflrulescreatecustom2009.

* cited by examiner

*Primary Examiner* — Pierre E Elisca
(74) *Attorney, Agent, or Firm* — Alberto Interian, III, Esq.

(57) ABSTRACT

A system that includes a processor, and computer executable instructions readable by the processor and operative to solicit or receive a selection to fill a coach position on a fantasy team, wherein the selection comprises a selection of a coach of a sports team, a member of the sports team, or a unit of the sports team to fill the coach position on the fantasy team, and determine a coach's score based on at least one on-field or off-field action or statistic of the sports team, the member of the sports team, or the unit of the sports team.

22 Claims, 8 Drawing Sheets

ELECTRONIC FANTASY SPORTS SYSTEM AND METHOD

PRIORITY CLAIM

The present application is a continuation-in-part of and claims priority to U.S. patent application Ser. No. 12/613,717, titled "System and Method for Conducting a Fantasy Sports Game," field on Nov. 6, 2009, by Isaac S. Daniel, whose disclosure is incorporated by reference as if fully stated herein.

FIELD

The present disclosure relates generally to electronic systems, and more particularly, to systems, methods, and various other disclosures for conducting a fantasy sports game.

BACKGROUND

Fantasy sports games have been played since the mid-twentieth century, and it is estimated that over thirty million people played fantasy sports in 2008. Fantasy sports games are based on the concept of allowing a participant to act as a team owner by allowing them to select "fantasy" players to their team, and then manage the players and the team throughout the season. "Fantasy" players consist of real life professional, amateur, collegiate, or academic athletes, so a participant can build a fantasy team of real life players from various real life teams.

Often times, participants compete against other participants who are in the same "fantasy league," with each participant's score being based on the real world performance of the players he or she has selected to their fantasy team. In fantasy sports games, participants can manage their players as if they were an actual team owner, such as by sitting a certain player out for the game, or trading a player away to another fantasy team.

There are several iterations on fantasy sports games, the most popular, however, are based on baseball, cricket, American football, football (soccer), basketball, golf, hockey, auto racing, and professional, amateur, collegiate, or academic wrestling.

Traditionally, fantasy sports games scoring systems have been based on on-field player performance. For example, in fantasy football, which is based on American football, a certain amount of points are awarded to a participant if one of their fantasy players scores a touchdown, while points are deducted if one of their players commits a mistake, such as fumbling the ball.

Thus far, participants have only been allowed to select players from real life sports teams, which, which has limited the scope and entertainment value of fantasy sports games.

Also, thus far, fantasy players' performance has been based only on on-field activities, such as in-game performance, and not off-field activities, such as arrests, charitable involvement, and the like, which has also limited the scope and entertainment value of fantasy sports games.

SUMMARY

The systems and methods described herein result from the realization that fantasy sports games can be broadened in scope and made more entertaining by allowing participants to select at least one coach.

The systems and methods described herein also result from the realization that fantasy sports games can be further broadened in scope and made more entertaining by assigning a point value to team and/or player off-field activity.

Accordingly, the various embodiments and disclosures described herein solve the limitations of the prior art in a new and novel manner.

DETAILED DESCRIPTION OF PREFERRED EMBODIMENTS

System Level Overview

Figure 1:
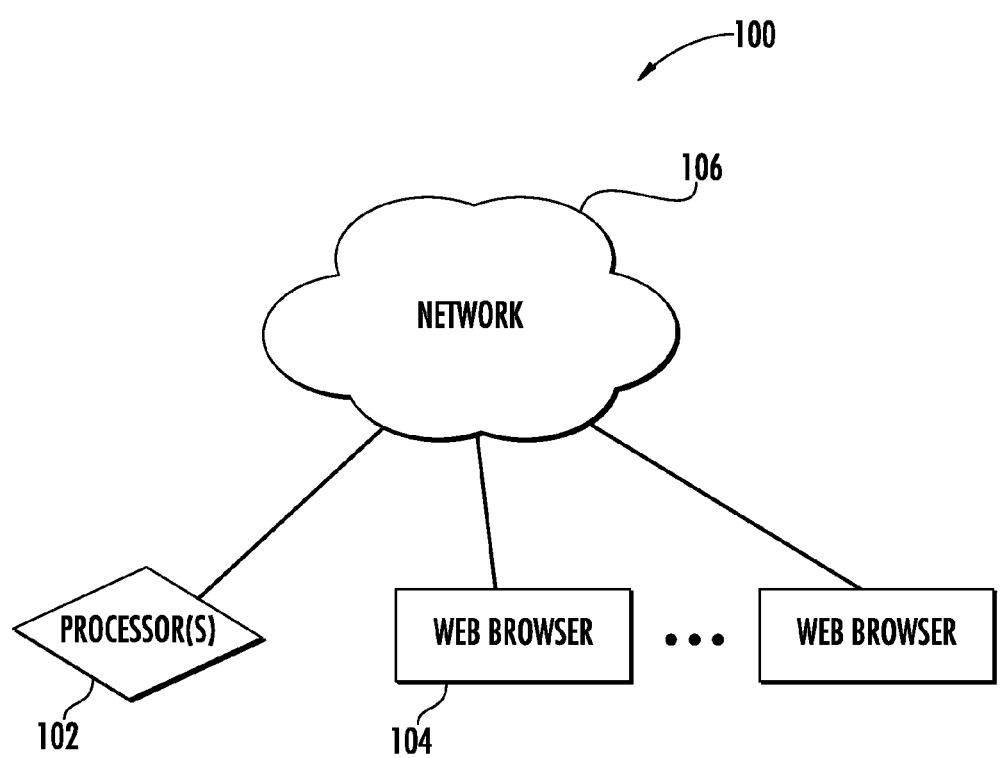
FIG. 1 shows a block diagram representing a system in accordance with one embodiment.

FIG. 1 shows a block diagram representing a system 100 in accordance with one embodiment. System 100 comprises a processor 102 and computer executable instructions (not shown) readable by the processor and operative to solicit at least one selection of at least one coach. In one embodiment, system 100 may be a fantasy sports game system, such as, but not limited to, fantasy American football, fantasy baseball, fantasy cricket, fantasy basketball, fantasy auto racing, fantasy rugby, fantasy soccer football (soccer), fantasy golf, fantasy tennis, fantasy hockey, and the like.

Processor 102 may be any type of processor, such as a central processing unit (CPU), a microprocessor, a front end processor, a coprocessor, a single-core processor, a multi-core processor, and the like.

The computer executable instructions may be any type of computer executable instructions, which may be in the form of a computer program, the program being composed in any suitable programming language or source code, such as C++, C, JAVA, JavaScript, HTML, XML, and other programming languages.

Soliciting at least one selection of at least one coach may include soliciting at least one selection of at least one coach during a draft period, which may be before the start of a season of a particular sport. In some embodiments, the coach may be any coach, such as, but not limited to, a head coach, a defensive coach, an offensive coach, and any other coach and/or manager.

The term "coach" as used throughout this disclosure, may refer to a real-life coach, such as, but not limited to, a head coach, a defensive coach, an offensive coach, or any other coach and/or manager. Such a coach may be the subject of a fantasy sports game.

In one embodiment, the computer executable instructions are operative to monitor at least one action of at least one member of a team. In another embodiment, the computer executable instructions are operative to monitor at least one on-field action of a member, or at least one off-field action of a member, or both. In yet another embodiment, the computer executable instructions are operative to monitor at least one action of a team as a whole. In yet another embodiment, the computer executable instructions are operative to monitor at least one action of a player on a team. In another embodiment, the computer executable instructions are operative to monitor at least one action of at least one coach on a team.

The term "member of a team" as used throughout this disclosure, may refer to any member of a sports team, such as, but not limited to, a player, a coach, an owner, a staff member, such as a trainer or doctor, or any other member of a sports team. The term "player" as used throughout this disclosure, may refer to a real-life athlete. Such an athlete may be the subject of a fantasy sports game.

In yet another embodiment, the computer executable instructions are operative to monitor at least one action of at least one player under the coach's supervision. For example, when a quarterbacks coach is selected, the computer executable instructions may be operative to monitor the actions of the quarterback. In another embodiment, the computer executable instructions are operative to monitor at least one unit of players under the coach's supervision. For example, when a defensive coordinator is selected, the computer executable instructions may be operative to monitor the actions of the defense. In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

In another embodiment, the computer executable instructions are operative to determine a coach's score based on the at least one action of at least one member of a team. In some embodiments, the computer executable instructions are operative to determine a coach's score based on the at least one action of at least one member of a team by assigning at least one point value to the at least one action, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the computer executable instructions may base the coach's score on the actions of the quarterback, or when a defensive coordinator is selected, the computer executable instructions may base the coach's score on the actions of the defense.

In another embodiment, the computer executable instructions are operative to solicit at least one selection of at least one coach through at least one network 106. Network 106 may be any type of computer network, such as a world-wide-web, a local area network (LAN), a wide area network (WAN), and integrated services digital network (ISDN), a dial-up network, and the like. The term "world-wide-web" may refer to any world-wide-web, which may include a set of interlinked hypertext documents accessed via a network of interconnected computers, such as the internet.

In another embodiment, the computer executable instructions are operative to solicit at least one selection of at least one coach through at least one web browser 104. Web browser 104 may be any type of web browser, such as MICROSOFT INTERNET EXPLORER®, NETSCAPE NAVIGATOR®, OPERA®, MOSAIC®, SAFARI®, CHROME®, and any other web browser capable of accessing a computer network, such as the world-wide-web or the internet.

Figure 2A:
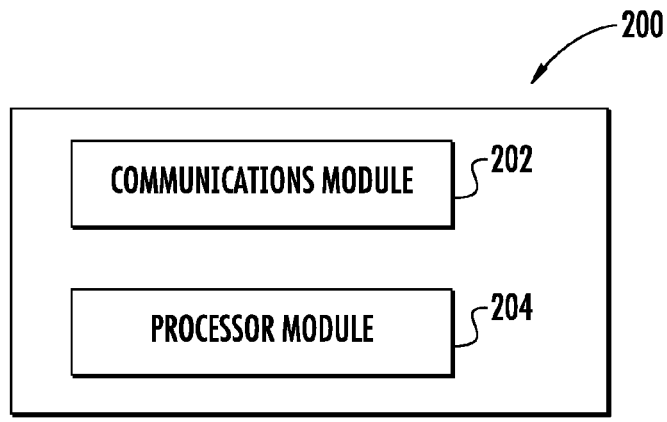
FIG. 2A shows a block diagram representing a system in accordance with another embodiment.

Referring now to FIG. 2A, a system 200 is shown in accordance with one embodiment. System 200 comprises of a communications module 202 to solicit at least one selection of at least one coach of at least one team, and a processor module 204 to determine a coach's score based on at least one action of at least one member of a team. In some embodiments, system 200 may be a fantasy sports game system, such as, but not limited to, fantasy American football, fantasy baseball, fantasy cricket, fantasy basketball, fantasy auto racing, fantasy rugby, fantasy soccer football (soccer), fantasy golf, fantasy tennis, fantasy hockey, and the like.

The term "module," as used throughout this disclosure, may refer to a unit of distinct functionality that may be presented in software, hardware, or combinations thereof. When the functionality of a module is performed in any part through software, the module includes a machine readable medium.

In one embodiment, in addition to soliciting at least one selection of at least one coach of at least one team, communications module 202 may receive and/or transmit game information, such as, but not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game.

The term "user," as used throughout this disclosure, may refer to the user of a system or method, such as a fantasy sports game system or method. A user may also be a participant in a fantasy sports game. A user may also be a moderator or administrator of a fantasy sports game.

In one embodiment, communications module 202 may comprise a software aspect, such as a computer program used to communicate. In another embodiment, communications module 202 may comprise a hardware aspect, such as communications hardware. Such communications hardware may include, but is not limited to, a network adapter and/or card, a modem, and the like. In yet another embodiment, communications module 206 may comprise both hardware and software aspects, such as those described directly above and elsewhere throughout the present disclosure.

In another embodiment, processor module 204 may use any of the methods to determine a coach's score based on at least one action of at least one member of a team described herein, such as, but not limited to, assigning at least one point value to at least one action of a member of a team, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, television interviews, and the like.

In some embodiments, the actions on which the coach's score is based may be the actions of the individual player or unit under the coach's supervision. For example, when a quarterbacks coach is selected, the coach's score may be based on the actions of the quarterback, or when a defensive coordinator is selected, the coach's score may be based on the actions of the defense.

In one embodiment, processor module 204 may comprise a hardware aspect such as a computer processor, including, but not limited to, any of those previously described with reference to the embodiments described throughout the present disclosure. In another embodiment, processor module 204 may comprise a software aspect, such as, but not limited to, a computer program, such as an operating system, sports statistics software, game management software, such as fantasy sports game management software, and the like. In yet another embodiment, processor module 204 may comprise both hardware and software aspects, such as those described directly above and elsewhere throughout the present disclosure.

Figure 2B:
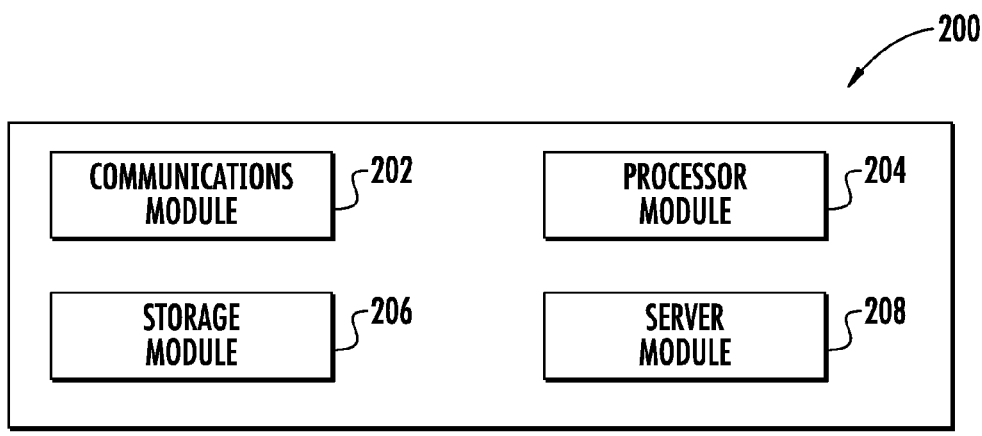
FIG. 2B shows a block diagram representing a system in accordance with yet another embodiment.

FIG. 2B shows system 200 in accordance with another embodiment. System 200 further comprises a storage module 206 to store game information. In various embodiments of system 200, such game information may include, but is not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game.

In one embodiment, storage module 206 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, storage module 206 may possess a software aspect, such as, but not limited to, database building software, file management software, and the like. In yet another embodiment, storage module 206 may comprise both hardware and software aspects, such as those described directly above and elsewhere throughout the present disclosure.

In another embodiment of system 200, system 200 further comprises a server module 208 to host a game, such as, but not limited to, a fantasy sports game. In some embodiments of system 200, server module 208 may host a game on a closed computer network, such as, but not limited to, a local area network (LAN), a wide area network (WAN), an integrated services digital network, a dial-up network, or other forms of a closed computer network. In an alternate embodiment of system 200, server module 208 may host a game on an open computer network, such as, but not limited to, a world-wide-web, or other forms of an open computer network. In one embodiment, server module 208 may comprise a hardware aspect, such as, but not limited to, a server computer. In another embodiment, server module 208 may comprise a software aspect, such as hosting computer software, including, but not limited to, a server operating system. In yet another embodiment, server module 208 may comprise both hardware and software aspects, such as those described directly above and elsewhere throughout the present disclosure.

In yet a further embodiment of system 200, system 200 further comprises an authentication module (not shown) to authenticate a client, such as a system user, such as, but not limited to, a game user, and/or an administrator, such as, but not limited to, a game moderator. In one embodiment, the authentication module may comprise a software aspect, such as, but not limited to, authentication software, and the like. In another embodiment, the authentication module may comprise a hardware aspect, such as, but not limited to, authentication hardware, and the like. In yet another embodiment, the authentication module may comprise both hardware and software aspects, such as those described directly above and elsewhere throughout the present disclosure.

In yet another embodiment of system 200, system 200 further comprises a display module (not shown) to display information, such as, but not limited to, game information, such as, but not limited to fantasy sports game information such as has been described elsewhere throughout the present disclosure. In a further embodiment, the display module is operative to display information on a web browser. In one embodiment, the display module may comprise a software aspect, such as display software, including, but not limited to, video software, video drivers, graphic display software, or other software suitable to display information. In another embodiment, the display module may comprise a hardware aspect, such as display hardware, including, but not limited to, a video graphics card, a computer monitor, a projector, a television, other forms of viewing screens, or other hardware suitable to display computer information. In yet another embodiment, the display module may comprise both hardware and software aspects, such as those described directly above and elsewhere throughout the present disclosure.

Figure 3:
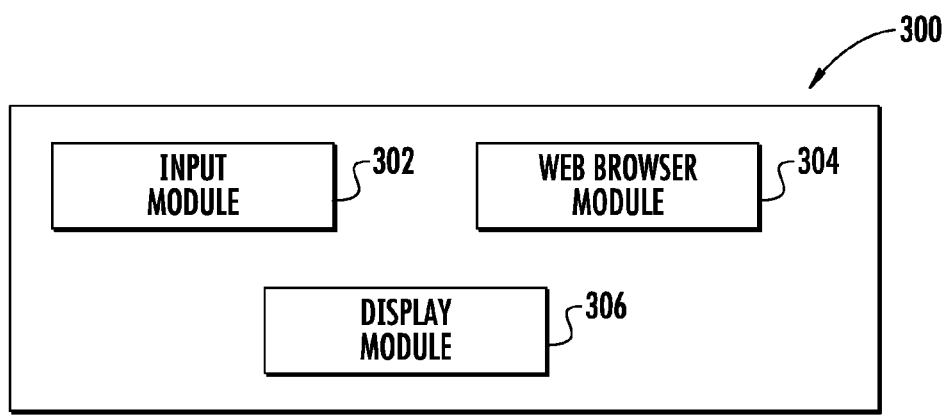
FIG. 3 shows a block diagram representing a system in accordance with one embodiment.

FIG. 3 shows a block diagram representing a system 300 in accordance with yet another embodiment. In one embodiment, system 300 comprises an input module 302 to receive user input, a web browser module 304 to transmit and/or receive information, and a display module 306 to display information, such as a game information, including, but not limited to, fantasy sports game information. System 300 may be a game system, such as, but not limited to, a fantasy sports game system.

In one embodiment of system 300, web browser module 304 is operative to transmit and/or receive game information, such as fantasy sports game information. In another embodiment, web browser module 304 is operative to access game information. In yet another embodiment, web browser module 304 is operative to transmit input information, such as, but not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure. In one embodiment, web browser module 304 may comprise a software aspect, such as a computer program, including, but not limited to, MICROSOFT INTERNET EXPLORER®, NETSCAPE NAVIGATOR®, OPERA®, MOSAIC®, SAFARI®, CHROME®, or any other form of computer software or program capable of browsing a computer network, such as the world-wide-web. In another embodiment, web browser module 304 may comprise a hardware aspect, such as a personal computer, including but not limited to, a web pc, a laptop, an internet station, a personal digital assistant, a smart phone, and the like. In yet another embodiment, web browser module 304 may comprise both hardware and software aspects, such as those described directly above and elsewhere throughout the present disclosure.

In another embodiment of system 300, display module 306 is operative to display game information, such as, but not limited to, game information, which may include coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure. In a further embodiment of system 300, display module 306 is operative to display game information on a web browser. In one embodiment, display module 306 may comprise a software aspect, such as, but not limited to, video software, video drivers, graphic display software, or other software suitable to display information. In another embodiment, display module 306 may comprise a hardware aspect, such as display hardware, including, but not limited to, a video graphics card, a computer monitor, a projector, a television, other forms of viewing screens, or other hardware suitable to display information. In yet another embodiment, display module 306 may comprise both hardware and software aspects, such as those described directly above and elsewhere throughout the present disclosure.

In one embodiment, system 300 further comprises a network module (not shown) to access a computer network. In one embodiment, the network module is operative to access a closed computer network, such as a local area network, a dial-up network, or another form of closed computer network. In another embodiment, the network module is operative to access an open computer network, such as a world-wide-web, or other form of open computer network. In one embodiment, the network module may comprise a software aspect, such as network software, including, but not limited to, networking software such as those produced by CISCO SYSTEMS®, SUN MICROSYSTEMS®, and ORACLE®. In another embodiment, the network module may comprise a hardware aspect, such as network hardware, including, but not limited to, a network adapter, a wireless network adapter, a modem, and other hardware capable of accessing and/or communicating through a network. In yet another embodiment, the network module may comprise both hardware and software modules, such as those described directly above and elsewhere throughout the present disclosure.

Figure 6A:
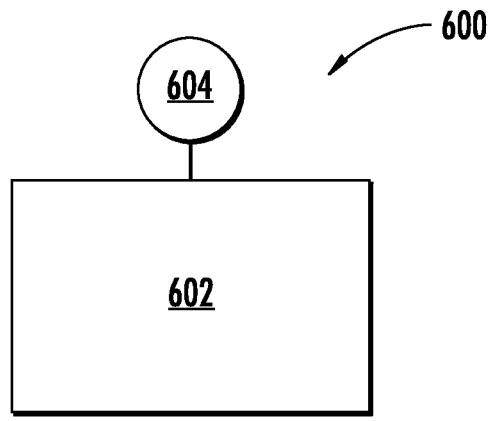
FIGS. 6A and 6B show block diagrams depicting a system in accordance with various embodiments.
Figure 6B:
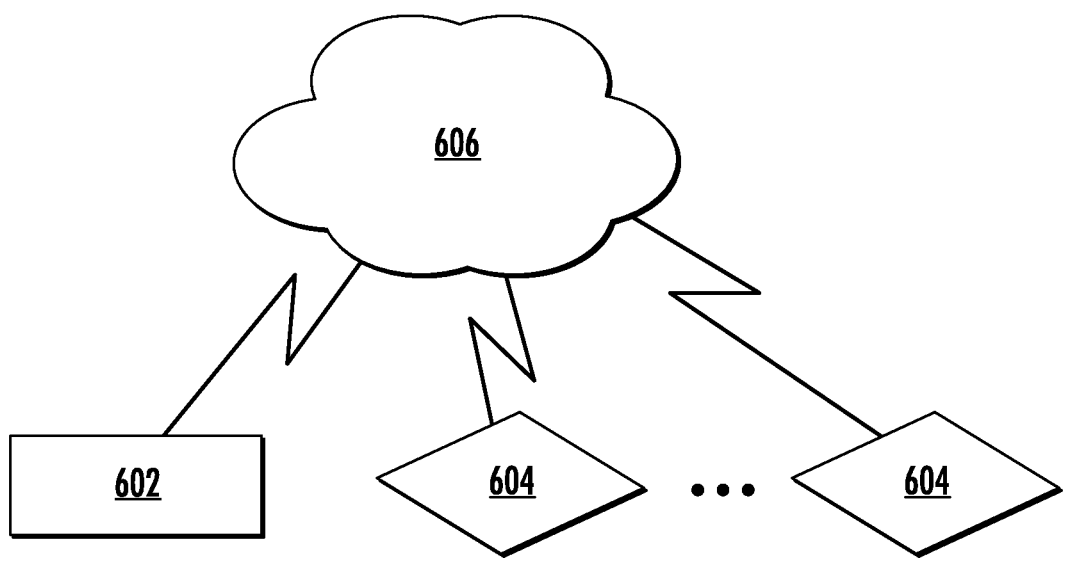

Referring now to FIG. 6, a system 600 is shown in accordance with one embodiment, wherein system 600 comprises at least one processor 602, and computer executable instructions 604 readable by processor 602 and operative to solicit at least one selection to fill at least one professional, amateur, collegiate, or academic coach position on at least one fantasy team, wherein the at least one selection comprises at least one selection of at least one professional, amateur, collegiate, or academic coach of: at least one professional, amateur, collegiate, or academic sports team, at least one member of the at least one professional, amateur, collegiate, or academic sports team, or at least one member of the at least one professional, amateur, collegiate, or academic sports team to fill the at least one professional, amateur, collegiate, or academic coach position on the at least one fantasy team, and determine at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

Processor 602 may be any type of processor, such as a central processing unit (CPU), a microprocessor, a front end processor, a coprocessor, a single-core processor, a multi-core processor, and the like. Processor 602 may be connected to or part of a server, such as a fantasy sports game or website server.

The computer executable instructions may be any type of computer executable instructions, which may be in the form of a computer program, the program being composed in any suitable programming language or source code, such as C++, C, JAVA, JavaScript, HTML, XML, and other programming languages. The computer executable instructions may be stored on a non-transitory medium, such as a hard drive, a solid state drive, a disc, and the like. The computer executable instructions may be in a transitory medium, such as a signal, electrical wave, or radio-frequency wave.

Soliciting or receiving at least one selection to fill at least one professional, amateur, collegiate, or academic coach position on at least one fantasy team may include soliciting at least one selection of at least one professional, amateur, collegiate, or academic coach during a draft period, which may be before the start of a season of a particular sport or fantasy season. In some embodiments, the professional, amateur, collegiate, or academic coach may be any coach, such as, but not limited to, at least one head coach or manager position, at least one assistance coach or manager position, at least one offensive coach or manager position, at least one defensive coach or manager position, or at least one special teams coach or manager position.

The term "coach" as used throughout this disclosure, may refer to a real-life professional, amateur, collegiate, or academic coach, such as, but not limited to, a head coach, a defensive coach, an offensive coach, or any other coach and/or manager. Such a coach may be the subject of or part of a fantasy sports game.

In one embodiment, the computer executable instructions are operative to monitor at least one action and/or statistic of the at least on professional, amateur, collegiate, or academic sports team, at least one member of the professional, amateur, collegiate, or academic sports team, or at least one unit of the professional, amateur, collegiate, or academic sports team. In another embodiment, the computer executable instructions are operative to monitor at least one on-field action or statistic of the at least on professional, amateur, collegiate, or academic sports team, at least one member of the professional, amateur, collegiate, or academic sports team, or at least one unit of the professional, amateur, collegiate, or academic sports team, and/or at least one off-field action or statistic of the at least on professional, amateur, collegiate, or academic sports team, at least one member of the professional, amateur, collegiate, or academic sports team, or at least one unit of the professional, amateur, collegiate, or academic sports team, and/or both on-field and off-field actions or statistics. In yet another embodiment, the computer executable instructions are operative to monitor at least one action or statistic of a professional, amateur, collegiate, or academic sports team as a whole. In yet another embodiment, the computer executable instructions are operative to monitor at least one action or statistic of a player on a team or a unit of a team. In another embodiment, the computer executable instructions are operative to monitor at least one action or statistic of at least one coach on a team.

The term "member of a team" as used throughout this disclosure, may refer to any member of a sports team, such as, but not limited to, a player, a coach, an owner, a staff member, such as a trainer or doctor, or any other member of a sports team. The term "player" as used throughout this disclosure, may refer to a real-life athlete. Such an athlete may be the subject of a fantasy sports game.

In some embodiments, the at least one professional, amateur, collegiate, or academic sports team may comprise any type of sports team or sporting activity team, such as, but not limited to: at least one professional, amateur, collegiate, or academic football team, at least one professional, amateur, collegiate, or academic baseball team, at least one professional, amateur, collegiate, or academic basketball team, at least one professional, amateur, collegiate, or academic racing team, at least one professional, amateur, collegiate, or academic cricket team, at least one olympic team, at least one professional, amateur, collegiate, or academic rugby team, or at least one professional, amateur, collegiate, or academic soccer team.

In some embodiments, the at least one fantasy team may comprise any type of fantasy team, such as, but not limited to a fantasy sports team, such as but not limited to at least one fantasy football team, at least one fantasy baseball team, at least one fantasy basketball team, at least one fantasy racing team, at least one fantasy cricket team, at least one fantasy olympic team, at least one fantasy rugby team, or at least one fantasy soccer team.

In yet another embodiment, the computer executable instructions are operative to monitor at least one action or statistic of at least one player, member, or unit under the coach's supervision. For example, when a quarterbacks coach is selected, the computer executable instructions may be operative to monitor the actions of the quarterback. In another embodiment, the computer executable instructions are operative to monitor at least one unit of players under the coach's supervision. For example, when a defensive coordinator is selected, the computer executable instructions may be operative to monitor the actions of the defense or members thereof.

In some embodiments, the actions and/or point values may be translated into or from on-field statistics or actions, such as certain plays or performances in a game, such as, but not limited to, a strike out, a tackle, a forced fumble, a fumble, an interception, a touchdown, yards gained, points scored, goals scored, field goals made, field goals missed, and the like.

In another embodiment, the at least one on-field action or statistic may comprise, but is not limited to:
  a. penalties, such as any type of penalty, including but not limited to, penalties assessed against the at least one professional, amateur, collegiate, or academic sports team, the at least one member of the at least one professional, amateur, collegiate, or academic sports team, or the at least one unit of the at least one professional, amateur, collegiate, or academic sports team, such as off-sides, fouls, holding, travelling, hitting a batter, false starts, pass interference, roughing a passer, roughing a kicker, flagrant fouls, technical fouls, unsportsmanlike conduct, ejections, suspensions, bans, too many players on a field or court, and the like;
  b. distance made by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of distance made, covered, or gained, such as, but not limited to yards gained, passing yards gained, rushing yards gained, special teams yards, kickoff or punt return yards, defensive yards, and the like;
  c. distance made margin (or difference) between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of distance made, covered, or gained, such as, but not limited to yards gained, passing yards gained, rushing yards gained, special teams yards, kickoff or punt return yards, defensive yards, and the like;
  d. distance allowed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of distance made, covered, or gained, such as, but not limited to yards gained, passing yards gained, rushing yards gained, special teams yards, kickoff or punt return yards, defensive yards, and the like;
  e. distance allowed margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of distance made, covered, or gained, such as, but not limited to yards gained, passing yards gained, rushing yards gained, special teams yards, kickoff or punt return yards, defensive yards, and the like;

f. time of possession for the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of time of possession, such as time that a team, member, or unit thereof is on offense, defense, in possession of a ball, puck, and the like;

g. time of possession margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of time of possession, such as time that a team, member, or unit thereof is on offense, defense, in possession of a ball, puck, and the like;

h. turnovers committed the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of turnover, including steals, blocks, interceptions, fumbles, and the like;

i. turnover margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of turnover, including steals, blocks, interceptions, fumbles, and the like;

j. points scored or scores by the at least one professional, amateur, collegiate, or academic sports team, the at least one member of the at least one professional, amateur, collegiate, or academic sports team, or the at least one unit of the at least one professional, amateur, collegiate, or academic sports team, wherein the points scored or scores may be any type of score or point, or category thereof, such as, but not limited to, a basket, a three-point basket, a field goal, a touchdown, a safety, a goal, a hit, a homerun, a win, a driver's point, a manufacturer's point, a score point, and the like;

k. points or scores allowed by the at least one professional, amateur, collegiate, or academic sports team, the at least one member of the at least one professional, amateur, collegiate, or academic sports team, or the at least one unit of the at least one professional, amateur, collegiate, or academic sports team, wherein the points scored or scores may be any type of score or point, or category thereof, such as, but not limited to, a basket, a three-point basket, a field goal, a touchdown, a safety, a goal, a hit, a homerun, a win, a driver's point, a manufacturer's point, a score point, and the like;

l. errors forced or committed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, a baseball error, a football error, a tennis error, a racing error, a cricket error, a basketball error, and the like;

m. outcomes of challenges to on-field rulings, such as, but not limited to, challenges to play rulings, touchdown rulings, penalty rulings, strike rulings, ball rulings, distance gained determination rulings, basket rulings, shot clock analysis rulings, time determination rulings, goal determination rulings, and the like;

n. red zone efficiency of the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to the number or type of points scored in red zone (e.g. field goal vs. touchdown), points or negative points for failing to score from the red zone, and the like, wherein the red zone comprises any type of zone near a point of scoring, such as, but not limited to a certain distance away from the point of scoring, such as twenty yards from an endzone, and the like;

o. first downs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a first down comprises a reset in the number of attempts a team, member, or unit thereof has to score or proceed to another point of reset, and the like;

p. three and outs performed or forced by the at least one professional, amateur, collegiate, or academic sports team, the at least one member of the at least one professional, amateur, collegiate, or academic sports team, or the at least one unit of the at least one professional, amateur, collegiate, or academic sports team, wherein a three and out comprises forcing an opponent to return possession of a ball or offensive position, and the like;

q. sacks allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a sack comprises a downing or stopping of a member of a team responsible for distributing a ball, and the like;

r. strike outs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

s. fumbles allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

t. interceptions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
u. successful or unsuccessful hit and runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
v. successful or unsuccessful stolen bases allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
w. successful or unsuccessful substitutions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a substitution comprises the substitution of a member of a team by a coach, such as a pitching change or a player substitution, wherein success is based on the new member or players success or performance in a game or an opponent of the new member or player, such as how well a relief pitcher performs against his first batter, and/or subsequent batters, and the like;
x. successful or unsuccessful pinch runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein the success of a pinch run or runner is based on the success of the pinch runner, such as a stolen base, being picked off, scoring a run, getting out, and the like;
y. successful or unsuccessful pinch hits allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein the success of a pinch hits or hitter is based on the success of a pinch hitter, such as whether the pinch hitter hits a run, an RBI (run-back-in), hits a hit, strike outs, gets a base on balls, grounds into a double play, hits a home run, and the like;
z. holding or allowing a lead to be held by the at least one professional, amateur, collegiate, or academic sports team, the at least one member of the at least one professional, amateur, collegiate, or academic sports team, or the at least one unit of the at least one professional, amateur, collegiate, or academic sports team, wherein holding or allowing a lead to be held comprises holding or allowing a lead to be held for a certain period of time, and wherein allowing a lead to be held comprises allowing an opponent, or member or unit thereof to hold a lead, and the like;
aa. coach, player, or team member ejections allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
bb. types of scores or points made or allowed by the at least one professional, amateur, collegiate, or academic sports team, the at least one member of the at least one professional, amateur, collegiate, or academic sports team, or the at least one unit of the at least one professional, amateur, collegiate, or academic sports team, wherein type of score or point may be any type of point or score, such as, but not limited to a field goal, a touchdown, a goal, a homerun, a hit, a RBI, a three point shot, a hat trick, an extra point, a safety, a driver's point, a manufacturer's point, and the like;
cc. fouls committed or forced by the at least one professional, amateur, collegiate, or academic sports team, the at least one member of the at least one professional, amateur, collegiate, or academic sports team, or the at least one unit of the at least one professional, amateur, collegiate, or academic sports team, and the like;
dd. buzzer beaters allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a buzzer beater comprises a score or point made soon before, at, or after the time in a game, or period thereof expires, and, wherein the buzzer beater may lead to a win, and the like;
ee. steals allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ff. accidents caused or committed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, car racing accidents, and the like;
gg. podium finishes by the at least one professional, amateur, collegiate, or academic sports team, the at least one member of the at least one professional, amateur, collegiate, or academic sports team, or the at least one unit of the at least one professional, amateur, collegiate, or academic sports team, and the like;
hh. pole positions earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ii. lap times performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
jj. number of wins or losses by the at least one professional, amateur, collegiate, or academic sports team, the at least one member of the at least one professional, amateur, collegiate, or academic sports team, or the at least one unit of the at least one professional, amateur, collegiate, or academic sports team, and the like;

kk. qualifying positions earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;

ll. manufacturer points earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;

mm. driver points earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;

nn. number of pit stops performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

oo. number or duration of timeouts taken or forced by the at least one professional, amateur, collegiate, or academic sports team, the at least one member of the at least one professional, amateur, collegiate, or academic sports team, or the at least one unit of the at least one professional, amateur, collegiate, or academic sports team, and the like;

pp. a successful or unsuccessful play or action allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like; or qq. titles achieved or allowed by the at least one professional, amateur, collegiate, or academic sports team, the at least one member of the at least one professional, amateur, collegiate, or academic sports team, or the at least one unit of the at least one professional, amateur, collegiate, or academic sports team, and the like.

In other embodiments, the actions and/or point values may be translated into or from off-field statistics or actions, such as, but not limited to, run-ins with the law, charitable activities, winning an award, making the pro-bowl or all-star game, poor television interviews, and the like.

In yet another embodiment, the off-field statistics or actions may include, but are not limited to:

a. charitable activities performed by the at least one professional, amateur, collegiate, or academic sports team, the at least one member of the at least one professional, amateur, collegiate, or academic sports team, or the at least one unit of the at least one professional, amateur, collegiate, or academic sports team, such as charitable fundraisers, promotions, endorsements, appearances, and the like;

b. awards earned by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, performers of the year, season, playoffs, championship, week, month, category, and the like;

c. spots in special events earned by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, making an all-star game, a pro-bowl game, and the like;

d. public speaking activities performed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, press conferences, conferences, speeches, interviews, and the like;

e. media interviews performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

f. public relations issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, bad press, league violations, run-ins with the law, in-team fighting or disputes, and the like;

g. locker room conduct, activities, actions, or behavior of the at least one professional, amateur, collegiate, or academic sports team, the at least one member of the at least one professional, amateur, collegiate, or academic sports team, or the at least one unit of the at least one professional, amateur, collegiate, or academic sports team, and the like;

h. legal issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, arrests, convictions, lawsuits, and the like; or i. league regulation issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, cheating, substance abuse violations, and the like.

In another embodiment, the computer executable instructions are operative to determine a coach's score based on the at least one action of the at least one professional, amateur, collegiate, or academic sports team, or a member or unit thereof. In some embodiments, the computer executable instructions are operative to determine a coach's score based on the at least one action of at least one member of a team by assigning at least one point value to the at least one action, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the computer executable instructions may be operative to determine at least one fantasy team score based on the at least one coach's score, wherein the coach's score comprises a component or part of the fantasy team score, and/or wherein the coach position comprises at least a part of the fantasy team.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions may and/or point values be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the computer executable instructions may base the coach's score on the actions of the quarterback, or when a defensive coordinator is selected, the computer executable instructions may base the coach's score on the actions of the defense.

In another embodiment, the computer executable instructions may be operative to determine at least one coach's score based on at least one opinion, wherein the at least one opinion comprises an opinion or score received from at least one journalist, expert, or judge, wherein the at least one journalist, expert, or judge is well versed in sports, or a particular sports. In another embodiment, the at least one off-field action or statistic scoring may be based on the opinion. For example, an expert, journalist, or judge may evaluation off-field actions or statistics and determine whether their occurrence should be considered in the scoring system, and if so, how much weight should be attributed to the off-field action or statistic.

In some embodiments, the computer executable instructions may be operative to determine at least one winner or loser of at least one fantasy game or league based on the at least one coach's score, or a component thereof.

The computer executable instructions may be operative to allow at least one user to submit a payment towards a pool, wherein the user may comprise a fantasy user or player, and the pool may be a pool of money contributed towards by a plurality of users in a fantasy game, wherein the winner, or winners, of that game is entitled to a part of or a whole of the pool. The pool of money may be stored in an account hosted or controlled by an operator of the fantasy game, and may automatically distribute (physically or electronically) the pool to the winner(s) upon completion of the fantasy game. Accordingly, the computer executable instructions may be operative to award a winner of at least one fantasy game or fantasy league with at least a portion of the pool.

In another embodiment, the computer executable instructions are operative to solicit or receive at least one selection of at least one coach through at least one network 606. Network 606 may be any type of computer network, such as a world-wide-web, a local area network (LAN), a wide area network (WAN), and integrated services digital network (ISDN), a dial-up network, and the like. The term "world-wide-web" may refer to any world-wide-web, which may include a set of interlinked hypertext documents accessed via a network of interconnected computers, such as the internet.

In another embodiment, the computer executable instructions are operative to solicit at least one selection of at least one coach through at least one web browser 604. Web browser 604 may be any type of web browser, such as MICROSOFT INTERNET EXPLORER®, NETSCAPE NAVIGATOR®, OPERA®, MOSAIC®, SAFARI®, CHROME®, and any other web browser capable of accessing a computer network, such as the world-wide-web or the internet.

Figure 7A:
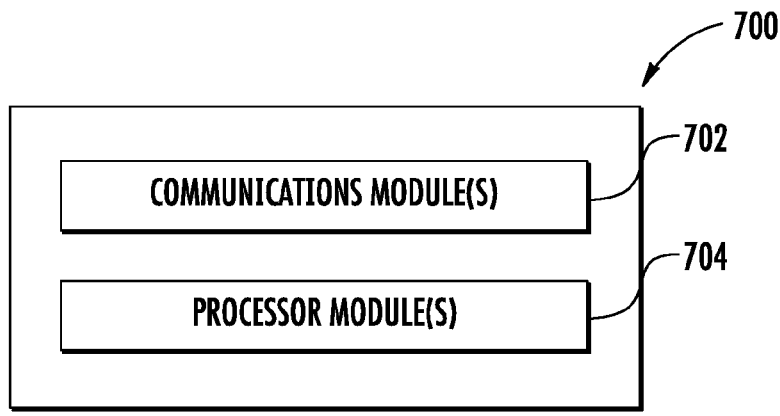
FIGS. 7A and 7B show block diagrams depicting a system in accordance with various embodiments.

Referring now to FIG. 7A, a system 700 is shown in accordance with one embodiment. System 700 comprises of at least one communications module 702 module to solicit or receive at least one selection to fill at least one professional, amateur, collegiate, or academic coach position on at least one fantasy team, wherein the at least one selection comprises at least one selection of at least one professional, amateur, collegiate, or academic coach of: at least one professional, amateur, collegiate, or academic sports team, at least one member of the at least one professional, amateur, collegiate, or academic sports team, or at least one member of the at least one professional, amateur, collegiate, or academic sports team to fill the at least one professional, amateur, collegiate, or academic coach position on the at least one fantasy team, and at least one processor module 704 to determine at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

In some embodiments, system 700 may be a fantasy sports game system, such as, but not limited to, fantasy American football, fantasy baseball, fantasy cricket, fantasy basketball, fantasy auto racing, fantasy rugby, fantasy soccer football (soccer), fantasy golf, fantasy tennis, fantasy hockey, and the like.

The term "module," as used throughout this disclosure, may refer to a unit of distinct functionality that may be presented in software, hardware, or combinations thereof. When the functionality of a module is performed in any part through software, the module includes a machine readable medium.

In one embodiment, in addition to soliciting at least one selection of at least one coach of at least one team, communications module 702 may receive and/or transmit game information, such as, but not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game.

The term "user," as used throughout this disclosure, may refer to the user of a system or method, such as a fantasy sports game system or method. A user may also be a participant in a fantasy sports game. A user may also be a moderator or administrator of a fantasy sports game.

In one embodiment, communications module 702 may comprise a software aspect, such as a computer program used to communicate. In another embodiment, communications module 702 may comprise a hardware aspect, such as communications hardware. Such communications hardware may include, but is not limited to, a network adapter and/or card, a modem, and the like. In yet another embodiment, communications module 706 may comprise both hardware and software aspects, such as those described directly above and elsewhere throughout the present disclosure.

In another embodiment, processor module 704 may use any of the methods to determine a coach's score based on at least one action of at least one member of a team described herein, such as, but not limited to, assigning at least one point value to at least one action of a member of a team, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, television interviews, and the like.

In some embodiments, the actions on which the coach's score is based may be the actions of the individual player or unit under the coach's supervision. For example, when a quarterbacks coach is selected, the coach's score may be based on the actions of the quarterback, or when a defensive coordinator is selected, the coach's score may be based on the actions of the defense.

In one embodiment, processor module 704 may comprise a hardware aspect such as a computer processor, including, but not limited to, any of those previously described with reference to the embodiments described throughout the present disclosure. In another embodiment, processor module 704 may comprise a software aspect, such as, but not limited to, a computer program, such as an operating system, sports statistics software, game management software, such as fantasy sports game management software, and the like. In yet another embodiment, processor module 704 may comprise both hardware and software aspects, such as those described directly above and elsewhere throughout the present disclosure.

Figure 7B:
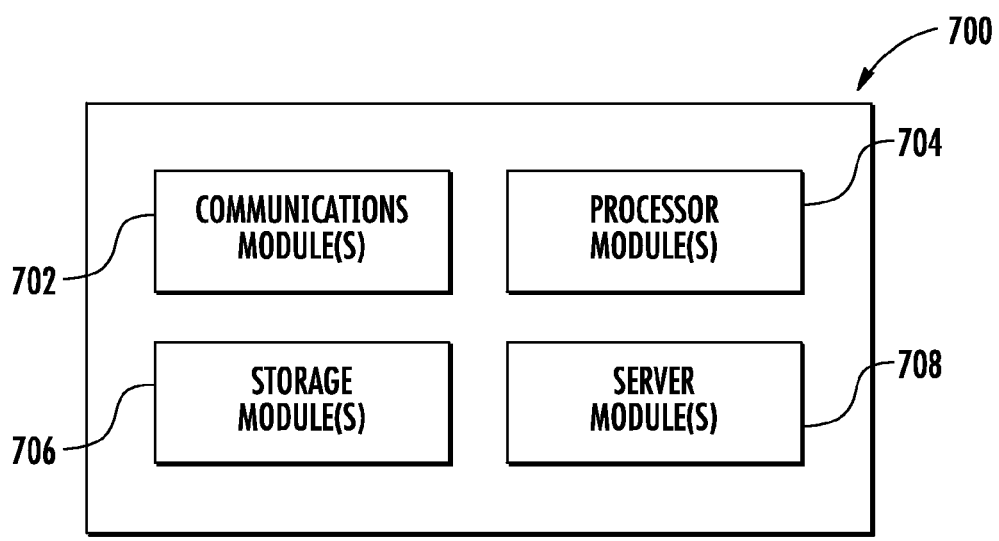

FIG. 7B shows system 700 in accordance with another embodiment. System 700 further comprises a storage module 706 to store game information. In various embodiments of system 700, such game information may include, but is not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game.

In one embodiment, storage module 706 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, storage module 706 may possess a software aspect, such as, but not limited to, database building software, file management software, and the like. In yet another embodiment, storage module 706 may comprise both hardware and software aspects, such as those described directly above and elsewhere throughout the present disclosure.

In another embodiment of system 700, system 700 further comprises a server module 708 to host a game, such as, but not limited to, a fantasy sports game. In some embodiments of system 700, server module 708 may host a game on a closed computer network, such as, but not limited to, a local area network (LAN), a wide area network (WAN), an integrated services digital network, a dial-up network, or other forms of a closed computer network. In an alternate embodiment of system 700, server module 708 may host a game on an open computer network, such as, but not limited to, a world-wide-web, or other forms of an open computer network. In one embodiment, server module 708 may comprise a hardware aspect, such as, but not limited to, a server computer. In another embodiment, server module 708 may comprise a software aspect, such as hosting computer software, including, but not limited to, a server operating system. In yet another embodiment, server module 708 may comprise both hardware and software aspects, such as those described directly above and elsewhere throughout the present disclosure.

In yet a further embodiment of system 700, system 700 further comprises an authentication module (not shown) to authenticate a client, such as a system user, such as, but not limited to, a game user, and/or an administrator, such as, but not limited to, a game moderator. In one embodiment, the authentication module may comprise a software aspect, such as, but not limited to, authentication software, and the like. In another embodiment, the authentication module may comprise a hardware aspect, such as, but not limited to, authentication hardware, and the like. In yet another embodiment, the authentication module may comprise both hardware and software aspects, such as those described directly above and elsewhere throughout the present disclosure.

In yet another embodiment of system 700, system 700 further comprises a display module (not shown) to display information, such as, but not limited to, game information, such as, but not limited to fantasy sports game information such as has been described elsewhere throughout the present disclosure. In a further embodiment, the display module is operative to display information on a web browser. In one embodiment, the display module may comprise a software aspect, such as display software, including, but not limited to, video software, video drivers, graphic display software, or other software suitable to display information. In another embodiment, the display module may comprise a hardware aspect, such as display hardware, including, but not limited to, a video graphics card, a computer monitor, a projector, a television, other forms of viewing screens, or other hardware suitable to display computer information. In yet another embodiment, the display module may comprise both hardware and software aspects, such as those described directly above and elsewhere throughout the present disclosure.

In some embodiments, the actions and/or point values may be translated into or from on-field statistics or actions, such as certain plays or performances in a game, such as, but not limited to, a strike out, a tackle, a forced fumble, a fumble, an interception, a touchdown, yards gained, points scored, goals scored, field goals made, field goals missed, and the like.

In another embodiment, the at least one on-field action or statistic may comprise, but is not limited to:

a. penalties, such as any type of penalty, including but not limited to, penalties assessed against the at least one professional, amateur, collegiate, or academic sports team, the at least one member of the at least one professional, amateur, collegiate, or academic sports team, or the at least one unit of the at least one professional, amateur, collegiate, or academic sports team, such as off-sides, fouls, holding, travelling, hitting a batter, false starts, pass interference, roughing a passer, roughing a kicker, flagrant fouls, technical fouls, unsportsmanlike conduct, ejections, suspensions, bans, too many players on a field or court, and the like;

b. distance made by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of distance made, covered, or gained, such as, but not limited to yards gained, passing yards gained, rushing yards gained, special teams yards, kickoff or punt return yards, defensive yards, and the like;

c. distance made margin (or difference) between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of distance made, covered, or gained, such as, but not limited to yards gained, passing yards gained, rushing yards gained, special teams yards, kickoff or punt return yards, defensive yards, and the like;

d. distance allowed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of distance made, covered, or gained, such as, but not limited to yards gained, passing yards gained, rushing yards gained, special teams yards, kickoff or punt return yards, defensive yards, and the like;

e. distance allowed margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of distance made, covered, or gained, such as, but not limited to yards gained, passing yards gained, rushing yards gained, special teams yards, kickoff or punt return yards, defensive yards, and the like;

f. time of possession for the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of time of possession, such as time that a team, member, or unit thereof is on offense, defense, in possession of a ball, puck, and the like;

g. time of possession margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of time of possession, such as time that a team, member, or unit thereof is on offense, defense, in possession of a ball, puck, and the like;

h. turnovers committed the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of turnover, including steals, blocks, interceptions, fumbles, and the like;

i. turnover margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of turnover, including steals, blocks, interceptions, fumbles, and the like;

j. points scored or scores by the at least one professional, amateur, collegiate, or academic sports team, the at least one member of the at least one professional, amateur, collegiate, or academic sports team, or the at least one unit of the at least one professional, amateur, collegiate, or academic sports team, wherein the points scored or scores may be any type of score or point, or category thereof, such as, but not limited to, a basket, a three-point basket, a field goal, a touchdown, a safety, a goal, a hit, a homerun, a win, a driver's point, a manufacturer's point, a score point, and the like;

k. points or scores allowed by the at least one professional, amateur, collegiate, or academic sports team, the at least one member of the at least one professional, amateur, collegiate, or academic sports team, or the at least one unit of the at least one professional, amateur, collegiate, or academic sports team, wherein the points scored or scores may be any type of score or point, or category thereof, such as, but not limited to, a basket, a three-point basket, a field goal, a touchdown, a safety, a goal, a hit, a homerun, a win, a driver's point, a manufacturer's point, a score point, and the like;

l. errors forced or committed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, a baseball error, a football error, a tennis error, a racing error, a cricket error, a basketball error, and the like;

m. outcomes of challenges to on-field rulings, such as, but not limited to, challenges to play rulings, touchdown rulings, penalty rulings, strike rulings, ball rulings, distance gained determination rulings, basket rulings, shot clock analysis rulings, time determination rulings, goal determination rulings, and the like;

n. red zone efficiency of the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to the number or type of points scored in red zone (e.g. field goal vs. touchdown), points or negative points for failing to score from the red zone, and the like, wherein the red zone comprises any type of zone near a point of scoring, such as, but not limited to a certain distance away from the point of scoring, such as twenty yards from an end-zone, and the like;

o. first downs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a first down comprises a reset in the number of attempts a team, member, or unit thereof has to score or proceed to another point of reset, and the like;

p. three and outs performed or forced by the at least one professional, amateur, collegiate, or academic sports team, the at least one member of the at least one professional, amateur, collegiate, or academic sports team, or the at least one unit of the at least one professional, amateur, collegiate, or academic sports team, wherein a three and out comprises forcing an opponent to return possession of a ball or offensive position, and the like;

q. sacks allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a sack comprises a downing or stopping of a member of a team responsible for distributing a ball, and the like;

r. strike outs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

s. fumbles allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

t. interceptions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

u. successful or unsuccessful hit and runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

v. successful or unsuccessful stolen bases allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

w. successful or unsuccessful substitutions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a substitution comprises the substitution of a member of a team by a coach, such as a pitching change or a player substitution, wherein success is based on the new member or players success or performance in a game or an opponent of the new member or player, such as how well a relief pitcher performs against his first batter, and/or subsequent batters, and the like;

x. successful or unsuccessful pinch runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein the success of a pinch run or runner is based on the success of the pinch runner, such as a stolen base, being picked off, scoring a run, getting out, and the like;

y. successful or unsuccessful pinch hits allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein the success of a pinch hits or hitter is based on the success of a pinch hitter, such as whether the pinch hitter hits a run, an RBI (run-back-in), hits a hit, strike outs, gets a base on balls, grounds into a double play, hits a home run, and the like;

z. holding or allowing a lead to be held by the at least one professional, amateur, collegiate, or academic sports team, the at least one member of the at least one professional, amateur, collegiate, or academic sports team, or the at least one unit of the at least one professional, amateur, collegiate, or academic sports team, wherein holding or allowing a lead to be held comprises holding or allowing a lead to be held for a certain period of time, and wherein allowing a lead to be held comprises allowing an opponent, or member or unit thereof to hold a lead, and the like;

aa. coach, player, or team member ejections allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

bb. types of scores or points made or allowed by the at least one professional, amateur, collegiate, or academic sports team, the at least one member of the at least one professional, amateur, collegiate, or academic sports team, or the at least one unit of the at least one professional, amateur, collegiate, or academic sports team, wherein type of score or point may be any type of point or score, such as, but not limited to a field goal, a touchdown, a goal, a homerun, a hit, a RBI, a three point shot, a hat trick, an extra point, a safety, a driver's point, a manufacturer's point, and the like;
cc. fouls committed or forced by the at least one professional, amateur, collegiate, or academic sports team, the at least one member of the at least one professional, amateur, collegiate, or academic sports team, or the at least one unit of the at least one professional, amateur, collegiate, or academic sports team, and the like;
dd. buzzer beaters allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a buzzer beater comprises a score or point made soon before, at, or after the time in a game, or period thereof expires, and, wherein the buzzer beater may lead to a win, and the like;
ee. steals allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ff. accidents caused or committed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, car racing accidents, and the like;
gg. podium finishes by the at least one professional, amateur, collegiate, or academic sports team, the at least one member of the at least one professional, amateur, collegiate, or academic sports team, or the at least one unit of the at least one professional, amateur, collegiate, or academic sports team, and the like;
hh. pole positions earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ii. lap times performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
jj. number of wins or losses by the at least one professional, amateur, collegiate, or academic sports team, the at least one member of the at least one professional, amateur, collegiate, or academic sports team, or the at least one unit of the at least one professional, amateur, collegiate, or academic sports team, and the like;
kk. qualifying positions earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ll. manufacturer points earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
mm. driver points earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
nn. number of pit stops performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
oo. number or duration of timeouts taken or forced by the at least one professional, amateur, collegiate, or academic sports team, the at least one member of the at least one professional, amateur, collegiate, or academic sports team, or the at least one unit of the at least one professional, amateur, collegiate, or academic sports team, and the like;
pp. a successful or unsuccessful play or action allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like; or
qq. titles achieved or allowed by the at least one professional, amateur, collegiate, or academic sports team, the at least one member of the at least one professional, amateur, collegiate, or academic sports team, or the at least one unit of the at least one professional, amateur, collegiate, or academic sports team, and the like.

In other embodiments, the actions and/or point values may be translated into or from off-field statistics or actions, such as, but not limited to, run-ins with the law, charitable activities, winning an award, making the pro-bowl or all-star game, poor television interviews, and the like.

In yet another embodiment, the off-field statistics or actions may include, but are not limited to:
a. charitable activities performed by the at least one professional, amateur, collegiate, or academic sports team, the at least one member of the at least one professional, amateur, collegiate, or academic sports team, or the at least one unit of the at least one professional, amateur, collegiate, or academic sports team, such as charitable fundraisers, promotions, endorsements, appearances, and the like;
b. awards earned by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, performers of the year, season, playoffs, championship, week, month, category, and the like;
c. spots in special events earned by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, making an all-star game, a pro-bowl game, and the like;
d. public speaking activities performed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, press conferences, conferences, speeches, interviews, and the like;

e. media interviews performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

f. public relations issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, bad press, league violations, run-ins with the law, in-team fighting or disputes, and the like;

g. locker room conduct, activities, actions, or behavior of the at least one professional, amateur, collegiate, or academic sports team, the at least one member of the at least one professional, amateur, collegiate, or academic sports team, or the at least one unit of the at least one professional, amateur, collegiate, or academic sports team, and the like;

h. legal issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, arrests, convictions, lawsuits, and the like; or i. league regulation issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, cheating, substance abuse violations, and the like.

In another embodiment, processor module 704 may be operative to determine a coach's score based on the at least one action of the at least one professional, amateur, collegiate, or academic sports team, or a member or unit thereof. In some embodiments, processor module 704 may be operative to determine a coach's score based on the at least one action of at least one member of a team by assigning at least one point value to the at least one action, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, processor module 704 may be operative to determine at least one fantasy team score based on the at least one coach's score, wherein the coach's score comprises a component or part of the fantasy team score, and/or wherein the coach position comprises at least a part of the fantasy team.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions may and/or point values be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the computer executable instructions may base the coach's score on the actions of the quarterback, or when a defensive coordinator is selected, the computer executable instructions may base the coach's score on the actions of the defense.

In another embodiment, processor module 704 may be operative to determine at least one coach's score based on at least one opinion, wherein the at least one opinion comprises an opinion or score received from at least one journalist, expert, or judge, wherein the at least one journalist, expert, or judge is well versed in sports, or a particular sports. In another embodiment, the at least one off-field action or statistic scoring may be based on the opinion. For example, an expert, journalist, or judge may evaluation off-field actions or statistics and determine whether their occurrence should be considered in the scoring system, and if so, how much weight should be attributed to the off-field action or statistic.

In some embodiments, processor module 704 may be operative to determine at least one winner or loser of at least one fantasy game or league based on the at least one coach's score, or a component thereof.

Processor module 704 may be operative to allow at least one user to submit a payment towards a pool, wherein the user may comprise a fantasy user or player, and the pool may be a pool of money contributed towards by a plurality of users in a fantasy game, wherein the winner, or winners, of that game is entitled to a part of or a whole of the pool. The pool of money may be stored in an account hosted or controlled by an operator of the fantasy game, and may automatically distribute (physically or electronically) the pool to the winner(s) upon completion of the fantasy game. Accordingly, processor module 704 may be operative to award a winner of at least one fantasy game or fantasy league with at least a portion of the pool.

In yet another embodiment, system 700 may comprise any or all of the other elements or features described throughout the present disclosure.

Methods

In this section, particular methods of example embodiments are described by reference to a series of flow charts. In some embodiments, the methods to be performed constitute computer programs made of computer executable instructions. In other embodiments, the methods described herein may be implemented as a computer readable medium having computer executable instructions. The term "compute readable medium," as used throughout this disclosure, ay refer to any computer readable medium, such as CD-ROMs, CD-Rs, CD-RWs, DVDs, DVD-RWs, DVD-Rs, floppy disks, hard drives, flash drives, diskettes, solid state drives, tape drives, and any other form of computer readable medium. The methods may further be carried out by various hardware features, functions, and articles of manufacture.

Figure 4:
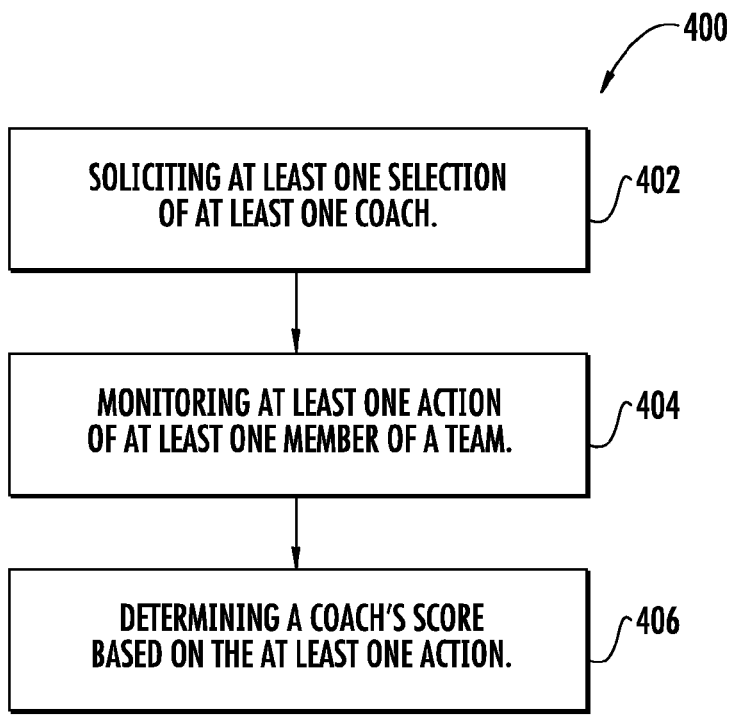
FIG. 4 shows a flow chart illustrating a method in accordance with one embodiment.

Referring now to FIG. 4, a flow chart illustrating a method 400 is shown in accordance with one embodiment. Method 400 comprises using a processor to perform at least a portion of one or more of the following: soliciting at least one selection of at least one coach (block 402), monitoring at least one action of at least one member of a team (block 404), and determining a coach's score based on the action (block 406). In some embodiments, method 400 may be a method for conducting a game, such as a fantasy sports game. In various embodiments, the processor may be any of the processors described above with reference to FIGS. 1 through 3.

In some embodiments, soliciting at least one selection of at least one coach 402 may include soliciting at least one selection of at least one coach during a draft period, which may be before the start of a season of a particular sport. In some embodiments, the coach may be any coach, such as, but not limited to, a head coach, a defensive coach, an offensive coach, and any other coach and/or manager.

In one embodiment, the computer executable instructions are operative to monitor at least one action of at least one member of a team. In one embodiment, the computer executable instructions are operative to monitor at least one on-field action of a member, or at least one off-field action of a member, or both. In yet another embodiment, the computer executable instructions are operative to monitor at least one action of a team as a whole. In another embodiment, the computer executable instructions are operative to monitor at least one action of a player on a team. In another embodiment, the computer executable instructions are operative to monitor at least one action of at least one coach on a team.

The term "member of a team" as used throughout this disclosure, may refer to any member of a sports team, such as, but not limited to, a player, a coach, an owner, a staff member, such as a trainer or doctor, or any other member of a sports team. The term "player" as used throughout this disclosure, may refer to a real-life athlete. Such an athlete may be the subject of a fantasy sports game.

In some embodiments, monitoring at least one action of at least one member of a team (step 404) may include monitoring at least one action of at least one player of a team. In other embodiments, step 404 may include monitoring at least one action of a team as a whole. In yet another embodiment, step 404 may include monitoring at least one action of at least one player under the coach's supervision. For example, when a quarterbacks coach is selected, step 404 may include monitoring the actions of the quarterback. In another embodiment, step 404 may include monitoring at least one action at least one unit of players under the coach's supervision. For example, when a defensive coordinator is selected, step 404 may include monitoring the actions of the defense. In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

Figure 5:
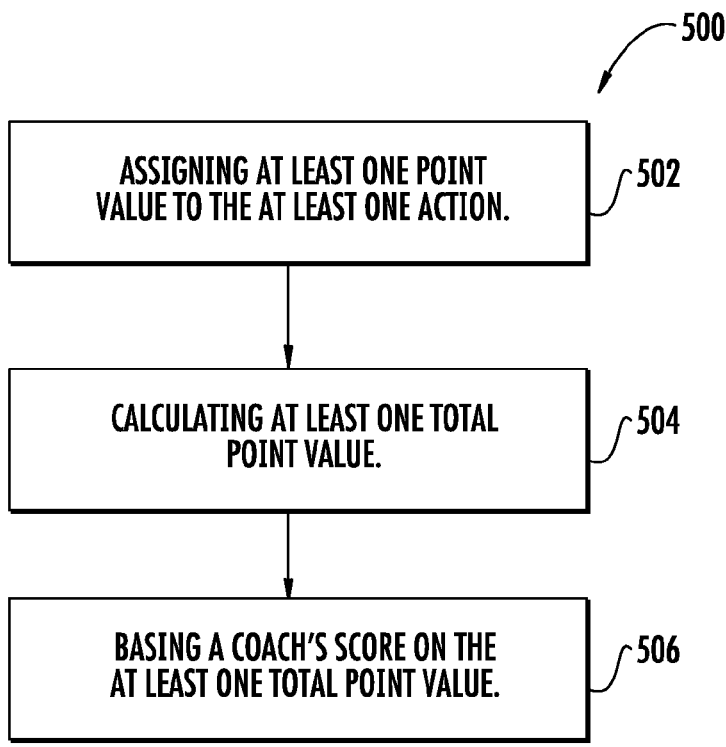
FIG. 5 shows a flow chart illustrating a method in accordance with another embodiment.

Referring now to FIG. 5, determining a coach's score based on the at least one action 500 (also step 406) may include assigning at least one point value to the at least one action 502, calculating at least one total point value 504, and basing a coach's score on the at least one total point value 506. In some embodiments, assigning at least one point value to the at least one action 502 includes assigning at least one positive point value to at least one action. In other embodiments, assigning at least one point value to at least one action 502 includes assigning at least one negative point value to at least one action. In another embodiment, assigning at least one point value to at least one action 502 includes assigning at least one point value to at least one on-field action. In yet another embodiment, assigning at least one point value to at least one action 502 includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the coach's score may be based on the actions of the quarterback, or when a defensive coordinator is selected, the coach's score may be based on the actions of the defense.

Referring back to FIG. 4, in some embodiments, method 400 may comprise determining a highest score of at least one user. The user may be a user of a fantasy sports game system and/or method. The user may also be a participant in a game, such as a fantasy sports game. Determining a highest score of a user may include determining a highest score by aggregating the scores of all the members of the user's fantasy sports team, such as, but not limited to, the coaches, the players, and other members of the team. Method 400 may also include announcing a winner of a fantasy sports contest by announcing the user who has the highest score at the end of the fantasy sports game season, and/or real life season.

In some embodiments, method 400 further comprises transmitting game information. Transmitting game information may include transmitting game information from a user of a game system and/or method to another user of the game system and/or method. In other embodiments, transmitting game information may include transmitting game information between a user of a system and/or method and an administrator/moderator of a system and/or method.

In some embodiments, transmitting game information may include transmitting game information through a computer network. The network may be any type of computer network, such as a world-wide-web, a local area network (LAN), a wide area network (WAN), and integrated services digital network (ISDN), a dial-up network, and the like.

The game information may include coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure.

In some embodiments, the method 400 is implemented as a computer readable medium having computer executable instructions.

Figure 8:
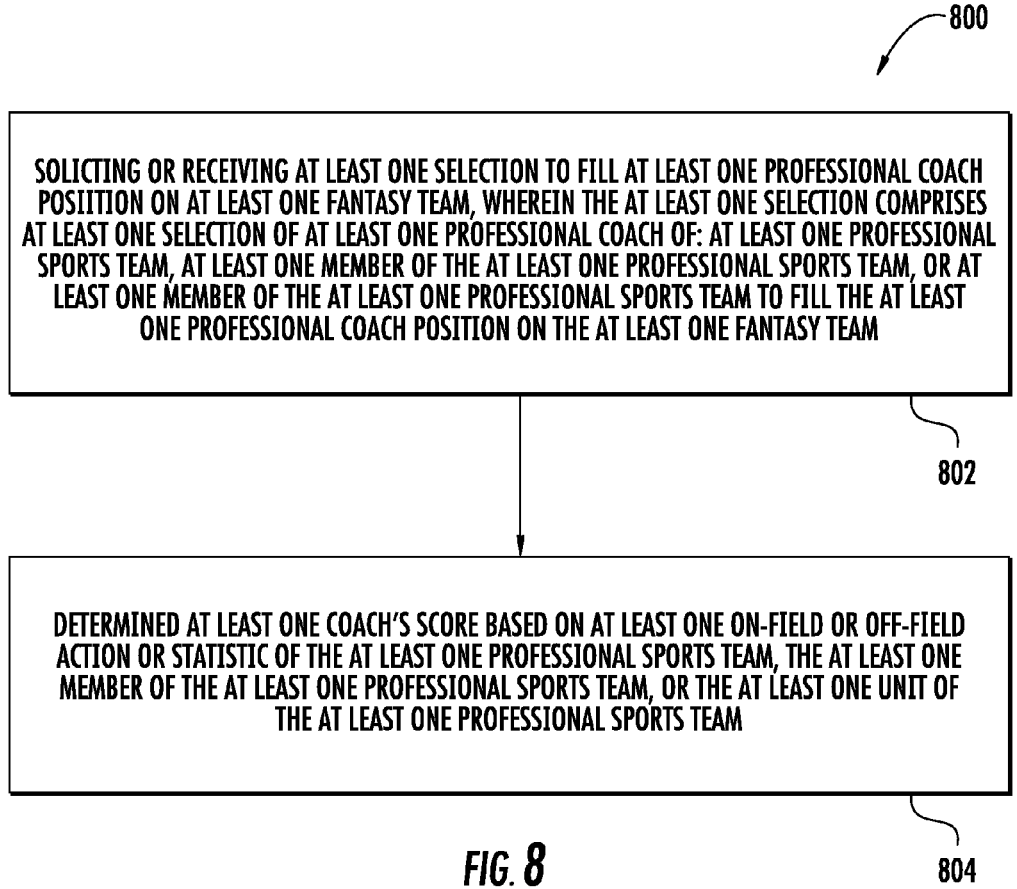
FIG. 8 shows a flow chart illustrating a method in accordance with one embodiment.

Referring now to FIG. 8, a flow chart illustrating a method 800 is shown in accordance with one embodiment, wherein method 800 may comprise using at least one processor to perform at least a portion of one or more of the following: soliciting or receiving at least one selection to fill at least one professional, amateur, collegiate, or academic coach position on at least one fantasy team, wherein the at least one selection comprises at least one selection of at least one professional, amateur, collegiate, or academic coach of, at least one professional, amateur, collegiate, or academic sports team, at least one member of the at least one professional, amateur, collegiate, or academic sports team, or at least one member of the at least one professional, amateur, collegiate, or academic sports team to fill the at least one professional, amateur, collegiate, or academic coach position on the at least one fantasy team (block 802), and determining at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team (block 804). In some embodiments, method 800 may be a method for conducting a game, such as a fantasy sports game. In various embodiments, the processor may be any of the processors described throughout the present disclosure.

In some embodiments, soliciting or receiving at least one selection of at least one professional, amateur, collegiate, or academic coach 802 may include soliciting or receiving at least one selection of at least one coach during a draft period, which may be before the start of a season of a particular sport. In some embodiments, the coach may be any coach, such as, but not limited to, a head coach, a defensive coach, an offensive coach, and any other coach and/or manager.

The term "member of a team" as used throughout this disclosure, may refer to any member of a sports team, such as, but not limited to, a player, a coach, an owner, a staff member, such as a trainer or doctor, or any other member of a sports team. The term "player" as used throughout this disclosure, may refer to a real-life athlete. Such an athlete may be the subject of a fantasy sports game.

In some embodiments, method 800 may comprise using at least one processor to monitor at least one action of at least one professional, amateur, collegiate, or academic sports team, or a member or unit thereof. In one embodiment, monitoring at least one action may comprise monitoring at least one on-field action of a member, or at least one off-field action of a member, a team, a unit, or both. In yet another embodiment, method 800 may comprise using at least on processor to monitor at least one action of a team as a whole. In another embodiment, method 800 may comprise monitoring at least one action of a player on a team. In another embodiment, method 800 may comprise monitoring at least one action of at least one coach on a team.

In some embodiments, monitoring at least one action of at least one member of a team may include monitoring at least one action of at least one player of a team. In other embodiments, monitoring may include monitoring at least one action of a team as a whole. In yet another embodiment, monitoring may include monitoring at least one action of at least one player under the coach's supervision. For example, when a quarterbacks coach is selected, monitoring may include monitoring the actions of the quarterback. In another embodiment, monitoring may include monitoring at least one action at least one unit of players under the coach's supervision. For example, when a defensive coordinator is selected, monitoring may include monitoring the actions of the defense. In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

In some embodiments, determining a coach's score based on the at least one on-field or off-field action or statistic may include assigning at least one point value to the at least one action, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the coach's score may be based on the actions of the quarterback, or when a defensive coordinator is selected, the coach's score may be based on the actions of the defense.

In some embodiments, method 800 may comprise determining a highest score of at least one user. The user may be a user of a fantasy sports game system and/or method. The user may also be a participant in a game, such as a fantasy sports game. Determining a highest score of a user may include determining a highest score by aggregating the scores of all the members of the user's fantasy sports team, such as, but not limited to, the coaches, the players, and other members of the team. Method 800 may also include announcing a winner of a fantasy sports contest by announcing the user who has the highest score at the end of the fantasy sports game season, and/or real life season.

In some embodiments, method 800 further comprises transmitting game information. Transmitting game information may include transmitting game information from a user of a game system and/or method to another user of the game system and/or method. In other embodiments, transmitting game information may include transmitting game information between a user of a system and/or method and an administrator/moderator of a system and/or method.

In some embodiments, transmitting game information may include transmitting game information through a computer network. The network may be any type of computer network, such as a world-wide-web, a local area network (LAN), a wide area network (WAN), and integrated services digital network (ISDN), a dial-up network, and the like.

The game information may include coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure.

In some embodiments, the actions and/or point values may be translated into or from on-field statistics or actions, such as certain plays or performances in a game, such as, but not limited to, a strike out, a tackle, a forced fumble, a fumble, an interception, a touchdown, yards gained, points scored, goals scored, field goals made, field goals missed, and the like.

In another embodiment, the at least one on-field action or statistic may comprise, but is not limited to:

a. penalties, such as any type of penalty, including but not limited to, penalties assessed against the at least one professional, amateur, collegiate, or academic sports team, the at least one member of the at least one professional, amateur, collegiate, or academic sports team, or the at least one unit of the at least one professional, amateur, collegiate, or academic sports team, such as off-sides, fouls, holding, travelling, hitting a batter, false starts, pass interference, roughing a passer, roughing a kicker, flagrant fouls, technical fouls, unsportsmanlike conduct, ejections, suspensions, bans, too many players on a field or court, and the like;

b. distance made by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of distance made, covered, or gained, such as, but not limited to yards gained, passing yards gained, rushing yards gained, special teams yards, kickoff or punt return yards, defensive yards, and the like;

c. distance made margin (or difference) between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of distance made, covered, or gained, such as, but not limited to yards gained, passing yards gained, rushing yards gained, special teams yards, kickoff or punt return yards, defensive yards, and the like;

d. distance allowed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of distance made, covered, or gained, such as, but not limited to yards gained, passing yards gained, rushing yards gained, special teams yards, kickoff or punt return yards, defensive yards, and the like;

e. distance allowed margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of distance made, covered, or gained, such as, but not limited to yards gained, passing yards gained, rushing yards gained, special teams yards, kickoff or punt return yards, defensive yards, and the like;

f. time of possession for the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of time of possession, such as time that a team, member, or unit thereof is on offense, defense, in possession of a ball, puck, and the like;

g. time of possession margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of time of possession, such as time that a team, member, or unit thereof is on offense, defense, in possession of a ball, puck, and the like;

h. turnovers committed the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, any type of turnover, including steals, blocks, interceptions, fumbles, and the like;

i. turnover margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game, such as, but not limited to, any type of turnover, including steals, blocks, interceptions, fumbles, and the like;

j. points scored or scores by the at least one professional, amateur, collegiate, or academic sports team, the at least one member of the at least one professional, amateur, collegiate, or academic sports team, or the at least one unit of the at least one professional, amateur, collegiate, or academic sports team, wherein the points scored or scores may be any type of score or point, or category thereof, such as, but not limited to, a basket, a three-point basket, a field goal, a touchdown, a safety, a goal, a hit, a homerun, a win, a driver's point, a manufacturer's point, a score point, and the like;

k. points or scores allowed by the at least one professional, amateur, collegiate, or academic sports team, the at least one member of the at least one professional, amateur, collegiate, or academic sports team, or the at least one unit of the at least one professional, amateur, collegiate, or academic sports team, wherein the points scored or scores may be any type of score or point, or category thereof, such as, but not limited to, a basket, a three-point basket, a field goal, a touchdown, a safety, a goal, a hit, a homerun, a win, a driver's point, a manufacturer's point, a score point, and the like;

l. errors forced or committed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, a baseball error, a football error, a tennis error, a racing error, a cricket error, a basketball error, and the like;

m. outcomes of challenges to on-field rulings, such as, but not limited to, challenges to play rulings, touchdown rulings, penalty rulings, strike rulings, ball rulings, distance gained determination rulings, basket rulings, shot clock analysis rulings, time determination rulings, goal determination rulings, and the like;

n. red zone efficiency of the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to the number or type of points scored in red zone (e.g. field goal vs. touchdown), points or negative points for failing to score from the red zone, and the like, wherein the red zone comprises any type of zone near a point of scoring, such as, but not limited to a certain distance away from the point of scoring, such as twenty yards from an endzone, and the like;

o. first downs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a first down comprises a reset in the number of attempts a team, member, or unit thereof has to score or proceed to another point of reset, and the like;

p. three and outs performed or forced by the at least one professional, amateur, collegiate, or academic sports team, the at least one member of the at least one professional, amateur, collegiate, or academic sports team, or the at least one unit of the at least one professional, amateur, collegiate, or academic sports team, wherein a three and out comprises forcing an opponent to return possession of a ball or offensive position, and the like;

q. sacks allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a sack comprises a downing or stopping of a member of a team responsible for distributing a ball, and the like;

r. strike outs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

s. fumbles allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

t. interceptions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

u. successful or unsuccessful hit and runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

v. successful or unsuccessful stolen bases allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;

w. successful or unsuccessful substitutions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a substitution comprises the substitution of a member of a team by a coach, such as a pitching change or a player substitution, wherein success is based on the new member or players success or performance in a game or an opponent of the new member or player, such as how well a relief pitcher performs against his first batter, and/or subsequent batters, and the like;

x. successful or unsuccessful pinch runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein the success of a pinch run or runner is based on the success of the pinch runner, such as a stolen base, being picked off, scoring a run, getting out, and the like;

y. successful or unsuccessful pinch hits allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein the success of a pinch hits or hitter is based on the success of a pinch hitter, such as whether the pinch hitter hits a run, an RBI (run-back-in), hits a hit, strike outs, gets a base on balls, grounds into a double play, hits a home run, and the like;

z. holding or allowing a lead to be held by the at least one professional, amateur, collegiate, or academic sports team, the at least one member of the at least one professional, amateur, collegiate, or academic sports team, or the at least one unit of the at least one professional, amateur, collegiate, or academic sports team, wherein holding or allowing a lead to be held comprises holding or allowing a lead to be held for a certain period of time, and wherein allowing a lead to be held comprises allowing an opponent, or member or unit thereof to hold a lead, and the like;
aa. coach, player, or team member ejections allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
bb. types of scores or points made or allowed by the at least one professional, amateur, collegiate, or academic sports team, the at least one member of the at least one professional, amateur, collegiate, or academic sports team, or the at least one unit of the at least one professional, amateur, collegiate, or academic sports team, wherein type of score or point may be any type of point or score, such as, but not limited to a field goal, a touchdown, a goal, a homerun, a hit, a RBI, a three point shot, a hat trick, an extra point, a safety, a driver's point, a manufacturer's point, and the like;
cc. fouls committed or forced by the at least one professional, amateur, collegiate, or academic sports team, the at least one member of the at least one professional, amateur, collegiate, or academic sports team, or the at least one unit of the at least one professional, amateur, collegiate, or academic sports team, and the like;
dd. buzzer beaters allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, wherein a buzzer beater comprises a score or point made soon before, at, or after the time in a game, or period thereof expires, and, wherein the buzzer beater may lead to a win, and the like;
ee. steals allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ff. accidents caused or committed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, car racing accidents, and the like;
gg. podium finishes by the at least one professional, amateur, collegiate, or academic sports team, the at least one member of the at least one professional, amateur, collegiate, or academic sports team, or the at least one unit of the at least one professional, amateur, collegiate, or academic sports team, and the like;
hh. pole positions earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ii. lap times performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
jj. number of wins or losses by the at least one professional, amateur, collegiate, or academic sports team, the at least one member of the at least one professional, amateur, collegiate, or academic sports team, or the at least one unit of the at least one professional, amateur, collegiate, or academic sports team, and the like;
kk. qualifying positions earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
ll. manufacturer points earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
mm. driver points earned by the at least one professional, amateur, collegiate, or academic sports team, the at least one member of the at least one professional, amateur, collegiate, or academic sports team, or the at least one unit of the at least one professional, amateur, collegiate, or academic sports team, and the like;
nn. number of pit stops performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
oo. number or duration of timeouts taken or forced by the at least one professional, amateur, collegiate, or academic sports team, the at least one member of the at least one professional, amateur, collegiate, or academic sports team, or the at least one unit of the at least one professional, amateur, collegiate, or academic sports team, and the like;
pp. a successful or unsuccessful play or action allowed or performed by the at least one professional, amateur, collegiate, or academic sports team, the at least one member of the at least one professional, amateur, collegiate, or academic sports team, or the at least one unit of the at least one professional, amateur, collegiate, or academic sports team, and the like; or
qq. titles achieved or allowed by the at least one professional, amateur, collegiate, or academic sports team, the at least one member of the at least one professional, amateur, collegiate, or academic sports team, or the at least one unit of the at least one professional, amateur, collegiate, or academic sports team, and the like.

In other embodiments, the actions and/or point values may be translated into or from off-field statistics or actions, such as, but not limited to, run-ins with the law, charitable activities, winning an award, making the pro-bowl or all-star game, poor television interviews, and the like.

In yet another embodiment, the off-field statistics or actions may include, but are not limited to:
j. charitable activities performed by the at least one professional, amateur, collegiate, or academic sports team, the at least one member of the at least one professional, amateur, collegiate, or academic sports team, or the at least one unit of the at least one professional, amateur, collegiate, or academic sports team, such as charitable fundraisers, promotions, endorsements, appearances, and the like;
k. awards earned by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, performers of the year, season, playoffs, championship, week, month, category, and the like;
l. spots in special events earned by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, making an all-star game, a pro-bowl game, and the like;
m. public speaking activities performed by the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, press conferences, conferences, speeches, interviews, and the like;
n. media interviews performed by the at least one professional, amateur, collegiate, or academic sports team, the at least one member of the at least one professional, amateur, collegiate, or academic sports team, or the at least one unit of the at least one professional, amateur, collegiate, or academic sports team, and the like;
o. public relations issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, bad press, league violations, run-ins with the law, in-team fighting or disputes, and the like;
p. locker room conduct, activities, actions, or behavior of the at least one professional, amateur, collegiate, or academic sports team, the at least one member of the at least one professional, amateur, collegiate, or academic sports team, or the at least one unit of the at least one professional, amateur, collegiate, or academic sports team, and the like;
q. legal issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, arrests, convictions, lawsuits, and the like; or
r. league regulation issues affecting the at least one professional, amateur, collegiate, or academic sports team, the at least one member of the at least one professional, amateur, collegiate, or academic sports team, or the at least one unit of the at least one professional, amateur, collegiate, or academic sports team, such as, but not limited to, cheating, substance abuse violations, and the like.

In some embodiments, method 800 may further comprise using at least one processor to determine at least one fantasy team score based on the at least one coach's score, wherein the coach's score comprises a component or part of the fantasy team score, and/or wherein the coach position comprises at least a part of the fantasy team.

In some embodiments, the actions on which the coach's score is based may be the actions of the individual player or unit under the coach's supervision. For example, when a quarterbacks coach is selected, the computer executable instructions may base the coach's score on the actions of the quarterback, or when a defensive coordinator is selected, the computer executable instructions may base the coach's score on the actions of the defense.

In another embodiment, method 800 may further comprise using at least one processor to determine at least one coach's score based on at least one opinion, wherein the at least one opinion comprises an opinion or score received from at least one journalist, expert, or judge, wherein the at least one journalist, expert, or judge is well versed in sports, or a particular sports. In another embodiment, the at least one off-field action or statistic scoring may be based on the opinion. For example, an expert, journalist, or judge may evaluation off-field actions or statistics and determine whether their occurrence should be considered in the scoring system, and if so, how much weight should be attributed to the off-field action or statistic.

In some embodiments, method 800 may further comprise using at least one processor to determine at least one winner or loser of at least one fantasy game or league based on the at least one coach's score, or a component thereof.

Method 800 may further comprise using at least one processor to allow at least one user to submit a payment towards a pool, wherein the user may comprise a fantasy user or player, and the pool may be a pool of money contributed towards by a plurality of users in a fantasy game, wherein the winner, or winners, of that game is entitled to a part of or a whole of the pool. The pool of money may be stored in an account hosted or controlled by an operator of the fantasy game, and may automatically distribute (physically or electronically) the pool to the winner(s) upon completion of the fantasy game. Accordingly, processor module 704 may be operative to award a winner of at least one fantasy game or fantasy league with at least a portion of the pool.

In some embodiments, method 800 may be implemented as a computer readable medium having computer executable instructions.

In some embodiments, method 800 may comprise any or all of those features, steps, and the like described elsewhere throughout the present disclosure.

Figure 9:
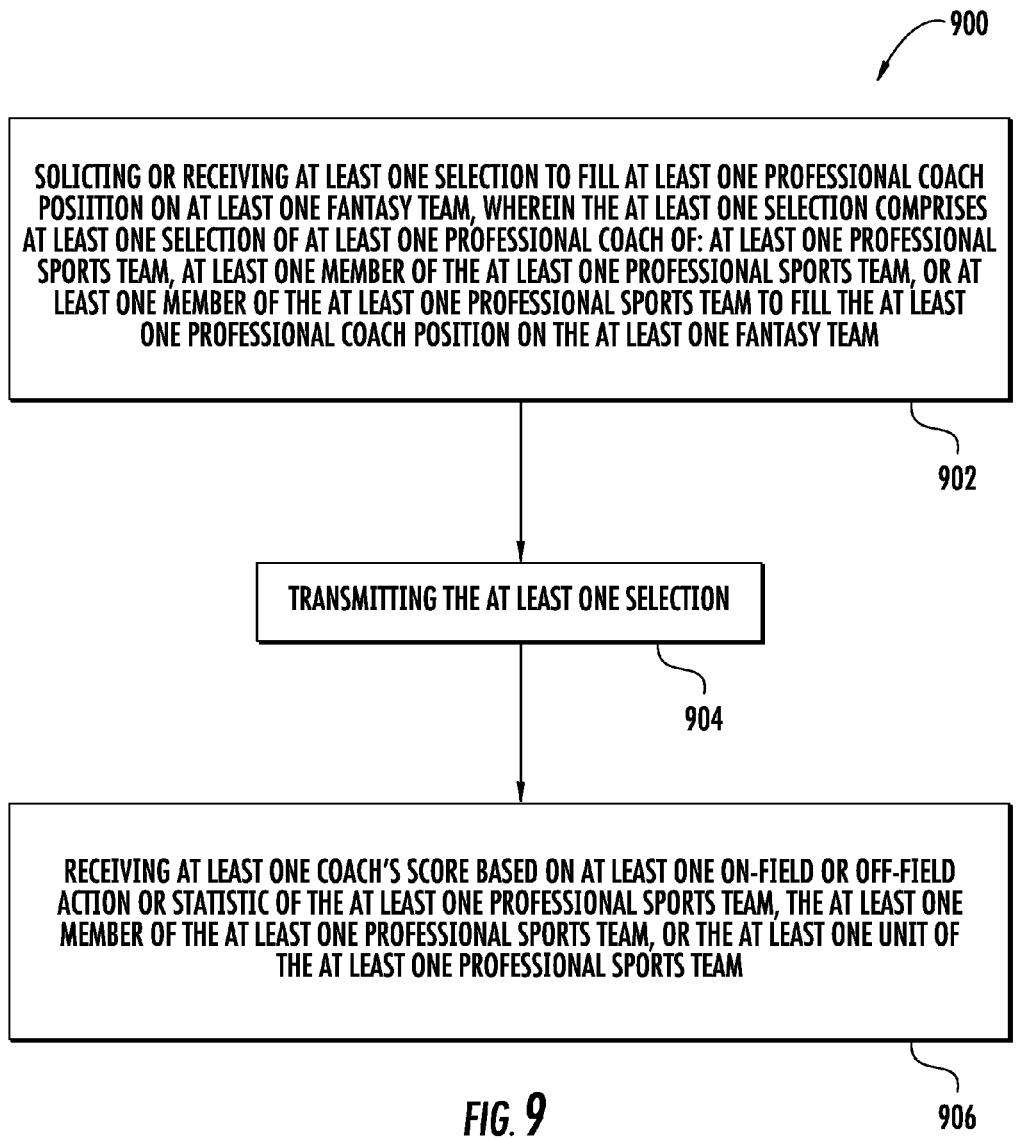
FIG. 9 shows a flow chart illustrating a method in accordance with another embodiment.
Figure 10:
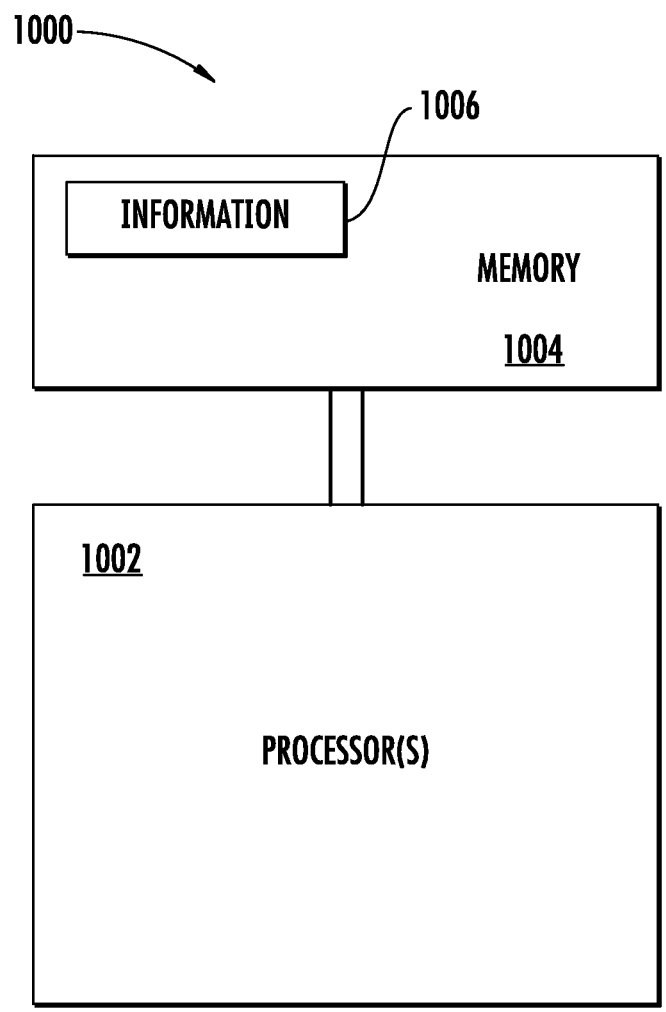
FIG. 10 shows a block diagram representing an article according to various embodiments.

Referring now to FIG. 9, a flow chart depicting a method 900 is shown in accordance with one embodiment, wherein method 900 comprises using at least one processor to perform at least a portion or all of the following: soliciting or receiving at least one selection to fill at least one professional, amateur, collegiate, or academic coach position on at least one fantasy team, wherein the at least one selection comprises at least one selection of at least one professional, amateur, collegiate, or academic coach of: at least one professional, amateur, collegiate, or academic sports team, at least one member of the at least one professional, amateur, collegiate, or academic sports team, or at least one member of the at least one professional, amateur, collegiate, or academic sports team to fill the at least one professional, amateur, collegiate, or academic coach position on the at least one fantasy team (block 902), transmitting the at least one selection (block 904), and receiving at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team (block 906).

In some embodiments, the at least one processor may be any type of processor, such as those various embodiments described throughout the present disclosure. In another embodiment, the at least one processor may be connected to or part of a user device, such as an electronic user device, which may include, but is not limited to, a smartphone, a tablet PC, a PC, and the like. The user device may be operative to connect to the various systems described herein, such as those described in FIGS. 1-8.

Soliciting or receiving at least one selection to fill at least one professional, amateur, collegiate, or academic coach position on at least one fantasy team may comprise any or all of the various embodiments described herein. In another embodiment, soliciting or receiving at least one selection may comprise using at least one user device to solicit or receive at least one selection. The user device may comprise a user input device, such as a touchscreen, a keyboard, and the like. Method 900 may comprise using computer executable instructions, such as a computer application, or downloadable computer application, residing on a user device, to solicit or receive the at least one selection.

In some embodiments, transmitting the at least one selection (block 904) may comprise using at least one communications module or means to transmit the at least one selection. Transmitting the at least one selection may comprise transmitting the at least one selection to at least one remote station or processor, such as a server, which may include a fantasy game server or host, which may include the various systems, or components thereof, described elsewhere throughout the present disclosure, such as systems 100, 200, 300, 600, and 700. Once transmitted, the at least one remote processor may carry out the various functions or steps described herein with regards to carrying out an electronic fantasy sports game.

Transmitting may be accomplished by using at least one computer network, such as those embodiments described herein.

In one embodiment, receiving at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team, may comprise receiving at least one coach's score from a remote station, such as those described above and elsewhere throughout the present disclosure, including, but not limited to, a fantasy sports game processor, server, station, or host.

Receiving may be accomplished by using at least one computer network, such as those embodiments described herein.

The steps of determining the at least one coach's score may be carried out by the remote processor, station, server, or host, using the functions or steps described in the present disclosure.

It should be noted that method 900, any of its steps and incorporated systems, may comprise using or working with any or all of those elements, features, functions, or steps described throughout the present disclosures.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

FIG. 6 is a block diagram representing an article according to various embodiments. Such embodiments may comprise a computer, a memory system, a magnetic or optical disk, some other storage device, or any type of electronic device or system. The article 600 may include one or more processor(s) 602 couple to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 602) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   a. at least one processor; and
   b. computer executable instructions readable by the at least one processor and operative to:
      i. solicit or receiving at least one selection to fill at least one professional, amateur, collegiate, or academic coach position on at least one fantasy team, wherein the at least one selection comprises at least one selection of at least one professional, amateur, collegiate, or academic coach of:
         1. at least one professional, amateur, collegiate, or academic sports team;
         2. at least one member of the at least one professional, amateur, collegiate, or academic sports team; or
         3. at least one unit of the at least one professional, amateur, collegiate, or academic sports team to fill the at least one professional, amateur, collegiate, or academic coach position on the at least one fantasy team; and
      ii. determine at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

2. The system of claim 1, wherein the at least one professional, amateur, collegiate, or academic sports team comprises:
   a. at least one professional, amateur, collegiate, or academic football team;
   b. at least one professional, amateur, collegiate, or academic baseball team;
   c. at least one professional, amateur, collegiate, or academic basketball team;
   d. at least one professional, amateur, collegiate, or academic racing team;
   e. at least one professional, amateur, collegiate, or academic cricket team;
   f. at least one professional, amateur, collegiate, or academic hockey team;
   g. at least one professional, amateur, collegiate, or academic soccer team;
   h. at least one professional, amateur, collegiate, or academic rugby team; or
   i. at least one olympic team.

3. The system of claim 1, wherein the at least one fantasy team comprises:
   a. at least one fantasy football team;
   b. at least one fantasy baseball team;
   c. at least one fantasy basketball team;
   d. at least one fantasy racing team;
   e. at least one fantasy cricket team;
   f. at least one fantasy hockey team;
   g. at least one fantasy olympic team;
   h. at least one fantasy rugby team; or
   i. at least one fantasy soccer team.

4. The system of claim 1, wherein the at least one professional, amateur, collegiate, or academic coach position comprises:
   a. at least one head coach or manager position;
   b. at least one assistance coach or manager position;
   c. at least one offensive coach or manager position;
   d. at least one defensive coach or manager position; or
   e. at least one special teams coach or manager position.

5. The system of claim 1, wherein the at least one professional, amateur, collegiate, or academic coach comprises:
   a. at least one head coach or manager;
   b. at least one assistance coach or manager;
   c. at least one offensive coach or manager;
   d. at least one defensive coach or manager; or
   e. at least one special teams coach or manager.

6. The system of claim 1, wherein the at least one on-field action or statistic comprises:
   a. penalties assessed against the at least one professional, amateur, collegiate, or academic sports team, the at least one member of the at least one professional, amateur, collegiate, or academic sports team, or the at least one unit of the at least one professional, amateur, collegiate, or academic sports team;
   b. distance made by the at least one professional, amateur, collegiate, or academic sports team, the at least one member of the at least one professional, amateur, collegiate, or academic sports team, or the at least one unit of the at least one professional, amateur, collegiate, or academic sports team;
   c. distance made margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   d. distance allowed by the at least one professional, amateur, collegiate, or academic sports team, the at least one member of the at least one professional, amateur, collegiate, or academic sports team, or the at least one unit of the at least one professional, amateur, collegiate, or academic sports team;
   e. distance allowed margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   f. time of possession for the at least one professional, amateur, collegiate, or academic sports team, the at least one member of the at least one professional, amateur, collegiate, or academic sports team, or the at least one unit of the at least one professional, amateur, collegiate, or academic sports team;
   g. time of possession margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   h. turnovers committed the at least one professional, amateur, collegiate, or academic sports team, the at least one member of the at least one professional, amateur, collegiate, or academic sports team, or the at least one unit of the at least one professional, amateur, collegiate, or academic sports team;
   i. turnover margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   j. points scored or scores by the at least one professional, amateur, collegiate, or academic sports team, the at least one member of the at least one professional, amateur, collegiate, or academic sports team, or the at least one unit of the at least one professional, amateur, collegiate, or academic sports team;
   k. points scored or scores allowed by the at least one professional, amateur, collegiate, or academic sports team, the at least one member of the at least one professional, amateur, collegiate, or academic sports team, or the at least one unit of the at least one professional, amateur, collegiate, or academic sports team;
   l. errors forced or committed by the at least one professional, amateur, collegiate, or academic sports team, the at least one member of the at least one professional, amateur, collegiate, or academic sports team, or the at least one unit of the at least one professional, amateur, collegiate, or academic sports team;
   m. outcomes of challenges to on-field rulings;
   n. red zone efficiency of the at least one professional, amateur, collegiate, or academic sports team, the at least one member of the at least one professional, amateur, collegiate, or academic sports team, or the at least one unit of the at least one professional, amateur, collegiate, or academic sports team;

o. first downs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
p. three and outs performed or forced by the at least one professional, amateur, collegiate, or academic sports team, the at least one member of the at least one professional, amateur, collegiate, or academic sports team, or the at least one unit of the at least one professional, amateur, collegiate, or academic sports team;
q. sacks allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
r. strike outs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
s. fumbles allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
t. interceptions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
u. successful or unsuccessful hit and runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
v. successful or unsuccessful stolen bases allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
w. successful or unsuccessful substitutions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
x. successful or unsuccessful pitching changes allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
y. successful or unsuccessful pinch runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
z. successful or unsuccessful pinch hits allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
aa. holding or allowing a lead to be held by the at least one professional, amateur, collegiate, or academic sports team, the at least one member of the at least one professional, amateur, collegiate, or academic sports team, or the at least one unit of the at least one professional, amateur, collegiate, or academic sports team;
bb. coach, player, or team member ejections allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
cc. types of scores or points made or allowed by the at least one professional, amateur, collegiate, or academic sports team, the at least one member of the at least one professional, amateur, collegiate, or academic sports team, or the at least one unit of the at least one professional, amateur, collegiate, or academic sports team;
dd. fouls committed or forced by the at least one professional, amateur, collegiate, or academic sports team, the at least one member of the at least one professional, amateur, collegiate, or academic sports team, or the at least one unit of the at least one professional, amateur, collegiate, or academic sports team;
ee. buzzer beaters allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
ff. steals allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
gg. accidents caused or committed by the at least one professional, amateur, collegiate, or academic sports team, the at least one member of the at least one professional, amateur, collegiate, or academic sports team, or the at least one unit of the at least one professional, amateur, collegiate, or academic sports team;
hh. podium finishes by the at least one professional, amateur, collegiate, or academic sports team, the at least one member of the at least one professional, amateur, collegiate, or academic sports team, or the at least one unit of the at least one professional, amateur, collegiate, or academic sports team;
ii. pole positions earned by the at least one professional, amateur, collegiate, or academic sports team, the at least one member of the at least one professional, amateur, collegiate, or academic sports team, or the at least one unit of the at least one professional, amateur, collegiate, or academic sports team;

jj. lap times performed by the at least one professional, amateur, collegiate, or academic sports team, the at least one member of the at least one professional, amateur, collegiate, or academic sports team, or the at least one unit of the at least one professional, amateur, collegiate, or academic sports team;

kk. number of wins or losses by the at least one professional, amateur, collegiate, or academic sports team, the at least one member of the at least one professional, amateur, collegiate, or academic sports team, or the at least one unit of the at least one professional, amateur, collegiate, or academic sports team;

ll. qualifying positions earned by the at least one professional, amateur, collegiate, or academic sports team, the at least one member of the at least one professional, amateur, collegiate, or academic sports team, or the at least one unit of the at least one professional, amateur, collegiate, or academic sports team;

mm. manufacturer points earned by the at least one professional, amateur, collegiate, or academic sports team, the at least one member of the at least one professional, amateur, collegiate, or academic sports team, or the at least one unit of the at least one professional, amateur, collegiate, or academic sports team;

nn. driver points earned by the at least one professional, amateur, collegiate, or academic sports team, the at least one member of the at least one professional, amateur, collegiate, or academic sports team, or the at least one unit of the at least one professional, amateur, collegiate, or academic sports team;

oo. number of pit stops performed by the at least one professional, amateur, collegiate, or academic sports team, the at least one member of the at least one professional, amateur, collegiate, or academic sports team, or the at least one unit of the at least one professional, amateur, collegiate, or academic sports team;

pp. number or duration of timeouts taken or forced by the at least one professional, amateur, collegiate, or academic sports team, the at least one member of the at least one professional, amateur, collegiate, or academic sports team, or the at least one unit of the at least one professional, amateur, collegiate, or academic sports team;

qq. a successful or unsuccessful play or action allowed or performed by the at least one professional, amateur, collegiate, or academic sports team, the at least one member of the at least one professional, amateur, collegiate, or academic sports team, or the at least one unit of the at least one professional, amateur, collegiate, or academic sports team; or rr. titles achieved or allowed by the at least one professional, amateur, collegiate, or academic sports team, the at least one member of the at least one professional, amateur, collegiate, or academic sports team, or the at least one unit of the at least one professional, amateur, collegiate, or academic sports team.

7. The system of claim 1, wherein the at least one off-field action or statistic comprises:

a. charitable activities performed by the at least one professional, amateur, collegiate, or academic sports team, the at least one member of the at least one professional, amateur, collegiate, or academic sports team, or the at least one unit of the at least one professional, amateur, collegiate, or academic sports team;

b. awards earned by the at least one professional, amateur, collegiate, or academic sports team, the at least one member of the at least one professional, amateur, collegiate, or academic sports team, or the at least one unit of the at least one professional, amateur, collegiate, or academic sports team;

c. spots in special events earned by the at least one professional, amateur, collegiate, or academic sports team, the at least one member of the at least one professional, amateur, collegiate, or academic sports team, or the at least one unit of the at least one professional, amateur, collegiate, or academic sports team;

d. public speaking activities performed by the at least one professional, amateur, collegiate, or academic sports team, the at least one member of the at least one professional, amateur, collegiate, or academic sports team, or the at least one unit of the at least one professional, amateur, collegiate, or academic sports team;

e. media interviews performed by the at least one professional, amateur, collegiate, or academic sports team, the at least one member of the at least one professional, amateur, collegiate, or academic sports team, or the at least one unit of the at least one professional, amateur, collegiate, or academic sports team;

f. public relations issues affecting the at least one professional, amateur, collegiate, or academic sports team, the at least one member of the at least one professional, amateur, collegiate, or academic sports team, or the at least one unit of the at least one professional, amateur, collegiate, or academic sports team;

g. locker room conduct, activities, actions, or behavior of the at least one professional, amateur, collegiate, or academic sports team, the at least one member of the at least one professional, amateur, collegiate, or academic sports team, or the at least one unit of the at least one professional, amateur, collegiate, or academic sports team;

h. legal issues affecting the at least one professional, amateur, collegiate, or academic sports team, the at least one member of the at least one professional, amateur, collegiate, or academic sports team, or the at least one unit of the at least one professional, amateur, collegiate, or academic sports team; or i. league regulation issues affecting the at least one professional, amateur, collegiate, or academic sports team, the at least one member of the at least one professional, amateur, collegiate, or academic sports team, or the at least one unit of the at least one professional, amateur, collegiate, or academic sports team.

8. The system of claim 1, wherein the computer executable instructions are operative to determine at least one coach's score based on at least one opinion.

9. The system of claim 8, wherein the at least one opinion comprises at least one opinion solicited or received from at least one journalist, expert, or judge.

10. The system of claim 1, wherein the computer executable instructions are operative to use the at least one processor to determine at least one winner or loser of at least one fantasy game or league based on the at least one coach's score.

11. The system of claim 1, wherein the computer executable instructions are operative to use the at least one processor to determine at least one fantasy team score based on the at least one coach's score.

12. The system of claim 1, wherein the computer executable instructions are operative to use the at least one processor to allow at least one user to submit a payment towards a pool.

13. The system of claim 12, wherein the computer executable instructions are operative to award a winner of at least one fantasy game or fantasy league with at least a portion of the pool.

14. The system of claim 13, wherein the at least one computer network comprises a world-wide-web.

15. The system of claim 1, wherein the computer executable instructions are operative to solicit or receive the at least one selection through at least one computer network.

16. A system comprising:
   a. at least one communications module to solicit or receive at least one selection to fill at least one professional, amateur, collegiate, or academic coach position on at least one fantasy team, wherein the at least one selection comprises at least one selection of at least one professional, amateur, collegiate, or academic coach of:
      i. at least one professional, amateur, collegiate, or academic sports team;
      ii. at least one member of the at least one professional, amateur, collegiate, or academic sports team; or
      iii. at least one unit of the at least one professional, amateur, collegiate, or academic sports team to fill the at least one professional, amateur, collegiate, or academic coach position on the at least one fantasy team; and
   b. at least one processor module to:
      i. determine at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

17. The system of claim 16, wherein the at least one on-field or off-field action or statistic comprises:
   a. penalties assessed against the at least one professional, amateur, collegiate, or academic sports team, the at least one member of the at least one professional, amateur, collegiate, or academic sports team, or the at least one unit of the at least one professional, amateur, collegiate, or academic sports team;
   b. distance made by the at least one professional, amateur, collegiate, or academic sports team, the at least one member of the at least one professional, amateur, collegiate, or academic sports team, or the at least one unit of the at least one professional, amateur, collegiate, or academic sports team;
   c. distance made margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   d. distance allowed by the at least one professional, amateur, collegiate, or academic sports team, the at least one member of the at least one professional, amateur, collegiate, or academic sports team, or the at least one unit of the at least one professional, amateur, collegiate, or academic sports team;
   e. distance allowed margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   f. time of possession for the at least one professional, amateur, collegiate, or academic sports team, the at least one member of the at least one professional, amateur, collegiate, or academic sports team, or the at least one unit of the at least one professional, amateur, collegiate, or academic sports team;
   g. time of possession margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   h. turnovers committed the at least one professional, amateur, collegiate, or academic sports team, the at least one member of the at least one professional, amateur, collegiate, or academic sports team, or the at least one unit of the at least one professional, amateur, collegiate, or academic sports team;
   i. turnover margin between the at least one professional, amateur, collegiate, or academic sports team, the at least one member of the at least one professional, amateur, collegiate, or academic sports team, or the at least one unit of the at least one professional, amateur, collegiate, or academic sports team and at least one opponent in at least one game;
   j. points scored or scores by the at least one professional, amateur, collegiate, or academic sports team, the at least one member of the at least one professional, amateur, collegiate, or academic sports team, or the at least one unit of the at least one professional, amateur, collegiate, or academic sports team;
   k. points or scores allowed by the at least one professional, amateur, collegiate, or academic sports team, the at least one member of the at least one professional, amateur, collegiate, or academic sports team, or the at least one unit of the at least one professional, amateur, collegiate, or academic sports team;
   l. errors forced or committed by the at least one professional, amateur, collegiate, or academic sports team, the at least one member of the at least one professional, amateur, collegiate, or academic sports team, or the at least one unit of the at least one professional, amateur, collegiate, or academic sports team;
   m. outcomes of challenges to on-field rulings;
   n. red zone efficiency of the at least one professional, amateur, collegiate, or academic sports team, the at least one member of the at least one professional, amateur, collegiate, or academic sports team, or the at least one unit of the at least one professional, amateur, collegiate, or academic sports team;
   o. first downs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;
   p. three and outs performed or forced by the at least one professional, amateur, collegiate, or academic sports team, the at least one member of the at least one professional, amateur, collegiate, or academic sports team, or the at least one unit of the at least one professional, amateur, collegiate, or academic sports team;
   q. sacks allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

r. strike outs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

s. fumbles allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

t. interceptions allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

u. successful or unsuccessful hit and runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

v. successful or unsuccessful stolen bases allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

w. successful or unsuccessful pitching changes allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

x. successful or unsuccessful pinch runs allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

y. successful or unsuccessful pinch hits allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

z. holding or allowing a lead to be held by the at least one professional, amateur, collegiate, or academic sports team, the at least one member of the at least one professional, amateur, collegiate, or academic sports team, or the at least one unit of the at least one professional, amateur, collegiate, or academic sports team;

aa. coach, player, or team member ejections allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

bb. types of scores or points made or allowed by the at least one professional, amateur, collegiate, or academic sports team, the at least one member of the at least one professional, amateur, collegiate, or academic sports team, or the at least one unit of the at least one professional, amateur, collegiate, or academic sports team;

cc. fouls committed or forced by the at least one professional, amateur, collegiate, or academic sports team, the at least one member of the at least one professional, amateur, collegiate, or academic sports team, or the at least one unit of the at least one professional, amateur, collegiate, or academic sports team;

dd. buzzer beaters allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

ee. steals allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

ff. accidents caused or committed by the at least one professional, amateur, collegiate, or academic sports team, the at least one member of the at least one professional, amateur, collegiate, or academic sports team, or the at least one unit of the at least one professional, amateur, collegiate, or academic sports team;

gg. podium finishes by the at least one professional, amateur, collegiate, or academic sports team, the at least one member of the at least one professional, amateur, collegiate, or academic sports team, or the at least one unit of the at least one professional, amateur, collegiate, or academic sports team;

hh. pole positions earned by the at least one professional, amateur, collegiate, or academic sports team, the at least one member of the at least one professional, amateur, collegiate, or academic sports team, or the at least one unit of the at least one professional, amateur, collegiate, or academic sports team;

ii. lap times performed by the at least one professional, amateur, collegiate, or academic sports team, the at least one member of the at least one professional, amateur, collegiate, or academic sports team, or the at least one unit of the at least one professional, amateur, collegiate, or academic sports team;

jj. number of wins or losses by the at least one professional, amateur, collegiate, or academic sports team, the at least one member of the at least one professional, amateur, collegiate, or academic sports team, or the at least one unit of the at least one professional, amateur, collegiate, or academic sports team;

kk. qualifying positions earned by the at least one professional, amateur, collegiate, or academic sports team, the at least one member of the at least one professional, amateur, collegiate, or academic sports team, or the at least one unit of the at least one professional, amateur, collegiate, or academic sports team;

ll. manufacturer points earned by the at least one professional, amateur, collegiate, or academic sports team, the at least one member of the at least one professional, amateur, collegiate, or academic sports team, or the at least one unit of the at least one professional, amateur, collegiate, or academic sports team;

mm. driver points earned by the at least one professional, amateur, collegiate, or academic sports team, the at least one member of the at least one professional, amateur, collegiate, or academic sports team, or the at least one unit of the at least one professional, amateur, collegiate, or academic sports team;

nn. number of pit stops performed by the at least one professional, amateur, collegiate, or academic sports team, the at least one member of the at least one professional, amateur, collegiate, or academic sports team, or the at least one unit of the at least one professional, amateur, collegiate, or academic sports team;

oo. number or duration of timeouts taken or forced by the at least one professional, amateur, collegiate, or academic sports team, the at least one member of the at least one professional, amateur, collegiate, or academic sports team, or the at least one unit of the at least one professional, amateur, collegiate, or academic sports team;

pp. a successful or unsuccessful play or action allowed or performed by the at least one professional, amateur, collegiate, or academic sports team, the at least one member of the at least one professional, amateur, collegiate, or academic sports team, or the at least one unit of the at least one professional, amateur, collegiate, or academic sports team;

qq. titles achieved or allowed by the at least one professional, amateur, collegiate, or academic sports team, the at least one member of the at least one professional, amateur, collegiate, or academic sports team, or the at least one unit of the at least one professional, amateur, collegiate, or academic sports team;

rr. charitable activities performed by the at least one professional, amateur, collegiate, or academic sports team, the at least one member of the at least one professional, amateur, collegiate, or academic sports team, or the at least one unit of the at least one professional, amateur, collegiate, or academic sports team;

ss. awards earned by the at least one professional, amateur, collegiate, or academic sports team, the at least one member of the at least one professional, amateur, collegiate, or academic sports team, or the at least one unit of the at least one professional, amateur, collegiate, or academic sports team;

tt. spots in special events earned by the at least one professional, amateur, collegiate, or academic sports team, the at least one member of the at least one professional, amateur, collegiate, or academic sports team, or the at least one unit of the at least one professional, amateur, collegiate, or academic sports team;

uu. public speaking activities performed by the at least one professional, amateur, collegiate, or academic sports team, the at least one member of the at least one professional, amateur, collegiate, or academic sports team, or the at least one unit of the at least one professional, amateur, collegiate, or academic sports team;

vv. media interviews performed by the at least one professional, amateur, collegiate, or academic sports team, the at least one member of the at least one professional, amateur, collegiate, or academic sports team, or the at least one unit of the at least one professional, amateur, collegiate, or academic sports team;

ww. public relations issues affecting the at least one professional, amateur, collegiate, or academic sports team, the at least one member of the at least one professional, amateur, collegiate, or academic sports team, or the at least one unit of the at least one professional, amateur, collegiate, or academic sports team;

xx. locker room conduct, activities, actions, or behavior of the at least one professional, amateur, collegiate, or academic sports team, the at least one member of the at least one professional, amateur, collegiate, or academic sports team, or the at least one unit of the at least one professional, amateur, collegiate, or academic sports team;

yy. legal issues affecting the at least one professional, amateur, collegiate, or academic sports team, the at least one member of the at least one professional, amateur, collegiate, or academic sports team, or the at least one unit of the at least one professional, amateur, collegiate, or academic sports team; or zz. league regulation issues affecting the at least one professional, amateur, collegiate, or academic sports team, the at least one member of the at least one professional, amateur, collegiate, or academic sports team, or the at least one unit of the at least one professional, amateur, collegiate, or academic sports team.

18. The system of claim 16, wherein the processor module is operative to determine at least one coach's score based on at least one opinion.

19. The system of claim 18, wherein the at least one opinion comprises at least one opinion solicited or received from at least one journalist, expert, or judge.

20. A method comprising:
a. using at least one processor to perform at least a portion of one or more of the following:
   i. soliciting or receiving at least one selection to fill at least one professional, amateur, collegiate, or academic coach position on at least one fantasy team, wherein the at least one selection comprises at least one selection of at least one professional, amateur, collegiate, or academic coach of:
      1. at least one professional, amateur, collegiate, or academic sports team;
      2. at least one member of the at least one professional, amateur, collegiate, or academic sports team; or
      3. at least one unit of the at least one professional, amateur, collegiate, or academic sports team to fill the at least one professional, amateur, collegiate, or academic coach position on the at least one fantasy team; and
   ii. determining at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

21. A non-transitory computer readable medium containing computer executable instructions operative to perform any or all of the following:
a. soliciting or receiving at least one selection to fill at least one professional, amateur, collegiate, or academic coach position on at least one fantasy team, wherein the at least one selection comprises at least one selection of at least one professional, amateur, collegiate, or academic coach of:
   i. at least one professional, amateur, collegiate, or academic sports team;
   ii. at least one member of the at least one professional, amateur, collegiate, or academic sports team; or iii. at least one unit of the at least one professional, amateur, collegiate, or academic sports team to fill the at least one professional, amateur, collegiate, or academic coach position on the at least one fantasy team; and
b. determining at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

22. A method comprising:
a. using at least one processor to perform any or all of the following:
i. soliciting or receiving at least one selection to fill at least one professional, amateur, collegiate, or academic coach position on at least one fantasy team, wherein the at least one selection comprises at least one selection of at least one professional, amateur, collegiate, or academic coach of:

1. at least one professional, amateur, collegiate, or academic sports team;
2. at least one member of the at least one professional, amateur, collegiate, or academic sports team; or
3. at least one member of the at least one professional, amateur, collegiate, or academic sports team to fill the at least one professional, amateur, collegiate, or academic coach position on the at least one fantasy team;

ii. transmitting the at least one selection; and
iii. receiving at least one coach's score based on at least one on-field or off-field action or statistic of the at least one professional, amateur, collegiate, or academic sports team, the at least one member of the at least one professional, amateur, collegiate, or academic sports team, or the at least one unit of the at least one professional, amateur, collegiate, or academic sports team.

* * * * *